United States Patent
Kim et al.

(10) Patent No.: US 9,872,240 B2
(45) Date of Patent: *Jan. 16, 2018

(54) NETWORK DEVICE SOURCE ENTITY TRIGGERED DEVICE CONFIGURATION SETUP

(71) Applicant: Belkin International, Inc., Playa Vista, CA (US)

(72) Inventors: Ryan Yong Kim, Rolling Hills Estates, CA (US); EuChong Son, Aliso Viejo, CA (US)

(73) Assignee: BELKIN INTERNATIONAL INC., Playa Vista, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/451,926

(22) Filed: Mar. 7, 2017

(65) Prior Publication Data

US 2017/0289901 A1 Oct. 5, 2017

Related U.S. Application Data

(63) Continuation-in-part of application No. 14/462,725, filed on Aug. 19, 2014, now abandoned, and a
(Continued)

(51) Int. Cl.
*H04L 12/28* (2006.01)
*H04W 48/16* (2009.01)
(Continued)

(52) U.S. Cl.
CPC ......... *H04W 48/16* (2013.01); *H04L 63/0876* (2013.01); *H04W 84/12* (2013.01)

(58) Field of Classification Search
CPC .... H04W 48/16; H04W 84/12; H04L 63/0876
See application file for complete search history.

(56) References Cited

U.S. PATENT DOCUMENTS 6,892,230 B1 5/2005 Gu et al.
6,910,068 B2 6/2005 Zintel et al.
(Continued)

FOREIGN PATENT DOCUMENTS

| WO | 2016/028779 A1 | 2/2016 |
| WO | WO2016028779 | * 2/2016 |
| WO | 2016040176 | 3/2016 |

OTHER PUBLICATIONS

Garcia-Morchon et al., "Cooperative security in distributed networks", Computer Communications vol. 36, No. 12, (2013), pp. 1284-1297.
(Continued)

*Primary Examiner* — Robert Wilson
(74) *Attorney, Agent, or Firm* — Kilpatrick Townsend & Stockton LLP

(57) ABSTRACT

The present disclosure relates to new network device source entity triggered device configuration setup. Specifically, various techniques and systems are provided for efficient setup of a acquired device on a network using information generated by a new network device source entity. More specifically, exemplary embodiments of the present invention include methods and systems for receiving, at a computing device connected to an established network device on a network, an acquisition communication including an indication that a new network device has been acquired; transmitting data to the established network device, wherein the data includes identification information associated with the new network device; receiving a join query, wherein the join query includes a request to authorize the new network device to join a network; and transmitting a response to the join query, wherein the response includes an authorization for the new network device to join the network.

24 Claims, 21 Drawing Sheets

Related U.S. Application Data continuation-in-part of application No. 14/946,308, filed on Nov. 19, 2015, and a continuation-in-part of application No. 14/946,348, filed on Nov. 19, 2015.

(51) Int. Cl.
*H04L 29/06* (2006.01)
*H04W 84/12* (2009.01)

(56) References Cited

U.S. PATENT DOCUMENTS

| | | |
|---|---|---|
| 7,242,928 B2 | 7/2007 | Choi |
| 7,376,717 B2 | 5/2008 | Bhogal |
| 7,583,685 B2 | 9/2009 | Teramoto et al. |
| 7,634,802 B2 | 12/2009 | Chiloyan et al. |
| 7,711,796 B2 | 5/2010 | Gutt et al. |
| 7,849,173 B1 | 12/2010 | Uhlik |
| 7,849,177 B2 | 12/2010 | Uhlik |
| 7,899,018 B2 | 3/2011 | Balasubramanian et al. |
| 7,975,140 B2 | 7/2011 | Fedyk et al. |
| 8,134,964 B2 | 3/2012 | Pan et al. |
| 8,214,496 B2 | 7/2012 | Gutt et al. |
| 8,244,223 B2 | 8/2012 | Farah |
| 8,331,544 B2 | 12/2012 | Kraus et al. |
| 8,369,880 B2 | 2/2013 | Citrano, III et al. |
| 8,392,585 B1 | 3/2013 | Balwani |
| 8,478,871 B2 | 7/2013 | Gutt et al. |
| 8,521,859 B2 | 8/2013 | Uhlik |
| 8,639,929 B2 | 1/2014 | Bian et al. |
| 8,655,995 B2 | 2/2014 | Elston, III et al. |
| 8,942,170 B1 | 1/2015 | Fang |
| 8,948,390 B2 | 2/2015 | Scott |
| 9,054,961 B1 | 6/2015 | Kim et al. |
| 9,130,928 B2 | 9/2015 | Qiu et al. |
| 9,185,066 B2 | 11/2015 | Douillet et al. |
| 9,210,192 B1 | 12/2015 | Kim et al. |
| 9,306,809 B2 | 4/2016 | Dawes et al. |
| 9,426,153 B2 | 8/2016 | Kim et al. |
| 9,451,462 B2 | 9/2016 | Kim et al. |
| 9,686,682 B2 | 6/2017 | Kim et al. |
| 9,713,003 B2 | 7/2017 | Kim et al. |
| 2003/0131129 A1 | 7/2003 | Becker et al. |
| 2004/0168081 A1* | 8/2004 | Ladas ................ H04L 63/061 726/8 |
| 2004/0179502 A1 | 9/2004 | Naghian et al. |
| 2006/0034234 A1* | 2/2006 | Watanabe .......... H04W 76/021 370/338 |
| 2006/0150241 A1 | 7/2006 | Huh et al. |
| 2006/0168647 A1 | 7/2006 | Chiloyan et al. |
| 2006/0212938 A1 | 9/2006 | Suzuki et al. |
| 2007/0027964 A1 | 2/2007 | Herrod et al. |
| 2007/0079113 A1 | 4/2007 | Kulkarni et al. |
| 2007/0170238 A1 | 7/2007 | Piersol et al. |
| 2008/0070495 A1 | 3/2008 | Stricklen et al. |
| 2008/0089300 A1 | 4/2008 | Yee et al. |
| 2008/0141347 A1 | 6/2008 | Kostiainen et al. |
| 2008/0263647 A1 | 10/2008 | Barnett et al. |
| 2009/0037207 A1 | 2/2009 | Farah et al. |
| 2009/0052667 A1 | 2/2009 | Iwamura et al. |
| 2009/0070436 A1 | 3/2009 | Dawes et al. |
| 2009/0070681 A1 | 3/2009 | Dawes et al. |
| 2009/0195402 A1 | 8/2009 | Izadi et al. |
| 2009/0268633 A1 | 10/2009 | Pan et al. |
| 2009/0279526 A1* | 11/2009 | Ichikawa ............. H04W 76/02 370/338 |
| 2010/0081375 A1 | 4/2010 | Rosenblatt et al. |
| 2010/0095359 A1 | 4/2010 | Gordon |
| 2010/0095369 A1 | 4/2010 | Gutt et al. |
| 2010/0189012 A1* | 7/2010 | Shibuya ............... H04W 76/02 370/254 |
| 2010/0220697 A1 | 9/2010 | Liu et al. |
| 2010/0250946 A1 | 9/2010 | Korte et al. |
| 2010/0318685 A1 | 12/2010 | Kraus et al. |
| 2011/0081860 A1 | 4/2011 | Brown et al. |
| 2011/0144773 A1 | 6/2011 | Van Herk et al. |
| 2011/0148567 A1 | 6/2011 | Lafond et al. |
| 2011/0307694 A1 | 12/2011 | Broustis et al. |
| 2012/0190386 A1 | 7/2012 | Anderson |
| 2012/0240191 A1 | 9/2012 | Husney et al. |
| 2012/0246294 A1 | 9/2012 | Eaton et al. |
| 2012/0317619 A1* | 12/2012 | Dattagupta ........... H04W 12/08 726/4 |
| 2013/0035067 A1 | 2/2013 | Zhang et al. |
| 2013/0073746 A1 | 3/2013 | Singh et al. |
| 2013/0094538 A1 | 4/2013 | Wang et al. |
| 2013/0132541 A1 | 5/2013 | Falk et al. |
| 2013/0151852 A1 | 6/2013 | Bian et al. |
| 2013/0183932 A1 | 7/2013 | Lemilainen et al. |
| 2013/0185368 A1 | 7/2013 | Nordstrom et al. |
| 2013/0191897 A1 | 7/2013 | Lindteigen et al. |
| 2013/0215467 A1 | 8/2013 | Fein et al. |
| 2013/0272186 A1 | 10/2013 | Mohanty et al. |
| 2013/0318343 A1 | 11/2013 | Bjarnason et al. |
| 2013/0326594 A1 | 12/2013 | Hanson et al. |
| 2013/0331127 A1 | 12/2013 | Sabatelli et al. |
| 2014/0005810 A1 | 1/2014 | Frei et al. |
| 2014/0059351 A1 | 2/2014 | Braskich et al. |
| 2014/0068719 A1 | 3/2014 | Kiukkonen et al. |
| 2014/0093079 A1 | 4/2014 | Scott et al. |
| 2014/0143397 A1 | 5/2014 | Gutt et al. |
| 2014/0167929 A1 | 6/2014 | Shim et al. |
| 2014/0207672 A1* | 7/2014 | Kelley ................ G06Q 20/4014 705/42 |
| 2014/0241354 A1 | 8/2014 | Shuman et al. |
| 2014/0269476 A1 | 9/2014 | Weston et al. |
| 2014/0280865 A1 | 9/2014 | Albertson et al. |
| 2014/0282257 A1 | 9/2014 | Nixon et al. |
| 2014/0289833 A1 | 9/2014 | Briceno et al. |
| 2014/0351312 A1 | 11/2014 | Lu et al. |
| 2014/0362991 A1 | 12/2014 | Ebrom |
| 2014/0369232 A1 | 12/2014 | Kim et al. |
| 2015/0023183 A1 | 1/2015 | Ilsar et al. |
| 2015/0023339 A1 | 1/2015 | Erickson et al. |
| 2015/0026317 A1 | 1/2015 | Ilsar et al. |
| 2015/0072677 A1 | 3/2015 | Yang |
| 2015/0113592 A1 | 4/2015 | Curtis et al. |
| 2015/0124968 A1 | 5/2015 | Scott |
| 2015/0133051 A1 | 5/2015 | Jamal-syed et al. |
| 2015/0245204 A1 | 8/2015 | Heydon |
| 2015/0282216 A1 | 10/2015 | Reshef et al. |
| 2016/0044032 A1 | 2/2016 | Kim et al. |
| 2016/0044719 A1* | 2/2016 | Sidhu ................ H04W 76/021 370/329 |
| 2016/0055469 A1 | 2/2016 | Kim et al. |
| 2016/0078426 A1* | 3/2016 | Kim ...................... H04L 41/12 705/21 |
| 2016/0081133 A1 | 3/2016 | Kim |
| 2016/0087838 A1 | 3/2016 | Kim et al. |
| 2016/0088478 A1 | 3/2016 | Kim et al. |
| 2016/0164831 A1* | 6/2016 | Kim ...................... H04L 43/08 709/223 |
| 2017/0094706 A1 | 3/2017 | Kim et al. |

OTHER PUBLICATIONS

Jehangir et al., "Securing Personal Network clusters" University of Twente, The Netherlands (2007), 10 pages.

Thomas et al., "Thingies for Dummies: A smart home infrastructure for the rest of us", Pervasive Computing Lab, IT University of Copenhagen (2012) 10 pages.

Yang et al., "ICEbox: toward easy-to-use home networking", Human-Computer Interaction—Interact, (2007), pp. 197-210.

International Search Report and Written Opinion of the International Searching Authority for PCT Application No. PCT/US2015/045692, dated Nov. 2, 2015, 12 pages.

International Preliminary Report on Patentability for PCT Application No. PCT/US2015/045692, dated Mar. 2, 2017, 9 pages.

Non Final Office Action dated Jan. 13, 2017 for U.S. Appl. No. 14/462,725, 14 pages.

Notice of Allowance dated Feb. 3, 2015 for U.S. Appl. No. 14/529,619, 8 pages.

(56) References Cited

OTHER PUBLICATIONS

Non-Final Office Action dated Sep. 25, 2015 for U.S. Appl. No. 14/529,745, 7 pages.
Notice of Allowance dated Apr. 25, 2016 for U.S. Appl. No. 14/529,745, 9 pages.
Notice of Allowance dated Aug. 14, 2015 for U.S. Appl. No. 14/479,545, 8 pages.
International Search Report and Written Opinion of the International Searching Authority for PCT Application No. PCT/US2015/048629, dated Nov. 11, 2015, 11 pages.
First Action Interview Pilot Program Pre-Interview Communication dated Nov. 25, 2015 for U.S. Appl. No. 14/455,940, 4 pages.
Notice of Allowance dated May 11, 2016 for U.S. Appl. No. 14/455,940, 15 pages.
First Action Interview Pilot Program Pre-Interview Communication dated May 20, 2016 for U.S. Appl. No. 14/947,001, 8 pages.
Notice of Allowance dated Feb. 10, 2017 for U.S. Appl. No. 14/947,001, 7 pages.
First Action Interview Office Action Summary dated Sep. 15, 2016 for U.S. Appl. No. 14/947,697, 5 pages.
First Action Interview Pilot Program Pre-Interview Communication dated May 27, 2016 for U.S. Appl. No. 14/947,697, 8 pages.
Notice of Allowance dated Mar. 13, 2017 for U.S. Appl. No. 14/947,697, 8 pages.
Non-Final Office Action dated May 22, 2017 for U.S. Appl. No. 15/363,051, 12 pages.

\* cited by examiner

NETWORK DEVICE SOURCE ENTITY TRIGGERED DEVICE CONFIGURATION SETUP

CROSS-REFERENCE TO RELATED APPLICATIONS

This application is a continuation-in-part of U.S. patent application Ser. No. 14/946,308 filed on Nov. 19, 2015. This application is also a continuation-in-part of U.S. patent application Ser. No. 14/946,348 filed on Nov. 19, 2015. This application is also a continuation-in-part of U.S. patent application Ser. No. 14/462,725 filed on Aug. 19, 2014. All of these applications are hereby incorporated by reference in their entireties for all purposes.

FIELD

The present disclosure relates to setup of network devices on a local area network. Specifically, various techniques and systems are provided for efficient setup of an acquired network device on a network using information generated by a source entity.

BRIEF SUMMARY

Example embodiments of the present invention include a computer-implemented method. The method may comprise receiving, at an established network device on a network, a communication including an indication that a new network device has been acquired by a user, wherein the new network device is associated with the user and the network; receiving a communication including new network device data, the new network device data including identification information associated with a new network device and a request for the new network device to join the network; generating and transmitting an authorization query, the authorization query including the identification information associated with the new network device and a new request to authorize the new network device to join the network; receiving a response to the authorization query, the response including an indication that the new network device is authorized to join the network; and transmitting network credentials to the new network device, wherein the network credentials facilitate the new network device joining the network, and wherein the new network device joins the network using the network credentials.

In another aspect, the method may further include transmitting a query including a request to verify that a network account is associated with the established network device, and receiving a response to the query including an indication that the network account is associated with the established network device. In another aspect, the method may further include transmitting an association communication including an indication that a new network device is associated with the network account. In another aspect, when the authorization query is received, the authorization query is displayed on an access device connected to the network, wherein the access device is configured to receive a response to the authorization query from the user. In another aspect, the established network device and the new network device were both acquired by the user. In another aspect, the method may further include receiving a communication including an indication that a new network device is associated with the network. In another aspect, the indication that the new network device has been acquired is based on identification information received from a source entity cloud network. In another aspect, the method may further include generating, by the existing network device, an authorization access point, and receiving, by the existing network device, a request from the new network device to communicatively connect to the authorization access point. These additional aspects may be applied to the below described computing device and non-transitory computer-readable storage medium example embodiments.

Alternative example embodiments of the present invention include a computing device. The computing device may comprise one or more processors; and a memory having instructions stored thereon, which when executed by the one or more processors, cause the computing device to perform operations. The operations may include receiving, at an established network device on a network, a communication including an indication that a new network device has been acquired by a user, wherein the new network device is associated with the user and the network; receiving a communication including new network device data, the new network device data including identification information associated with a new network device and a request for the new network device to join the network; generating and transmitting an authorization query, the authorization query including the identification information associated with the new network device and a new request to authorize the new network device to join the network; receiving a response to the authorization query, the response including an indication that the new network device is authorized to join the network; and transmitting network credentials to the new network device, wherein the network credentials facilitate the new network device joining the network, and wherein the new network device joins the network using the network credentials.

Alternative example embodiments of the present invention may include a non-transitory computer-readable storage medium having instructions stored thereon, which when executed by a computing device, cause the computing device to receive, at an established network device on a network, a communication including an indication that a new network device has been acquired by a user, wherein the new network device is associated with the user and the network; receive a communication including new network device data, the new network device data including identification information associated with a new network device and a request for the new network device to join the network; generate and transmitting an authorization query, the authorization query including the identification information associated with the new network device and a new request to authorize the new network device to join the network; receive a response to the authorization query, the response including an indication that the new network device is authorized to join the network; and transmit network credentials to the new network device, wherein the network credentials facilitate the new network device joining the network, and wherein the new network device joins the network using the network credentials.

Alternative example embodiments of the present invention include a computer-implemented method. The method may comprise receiving, at a computing device connected to an established network device on a network, an acquisition communication including an indication that a new network device has been acquired and identification information associated with the new network device, wherein the identification information includes data that identifies the new network device; transmitting, by the computing device, new network device data to the established network device, wherein the new network device data includes the identification information associated with the new network device; receiving, by the computing device, a join query, wherein the join query includes a request to authorize the new network device to join the network; and transmitting, by the computing device, a response to the join query, wherein the response includes an authorization for the new network device to join the network. These steps may also be used within the context of a non-transitory computer-readable storage medium having instructions stored thereon with a computing device to execute the instructions as described herein.

In another aspect, the acquisition communication includes identification data related to the acquirer of the new network device. In another aspect, the acquisition communication includes an indication that the new network device has been acquired. In another aspect, the new network device was associated with the established network device. In another aspect, the method further includes receiving an account query, wherein the account query includes a request to create a network account associated with the established network device; and transmitting a network communication, the network communication including data associated with the network account. In another aspect, the method may further include receiving a query including a request to verify that a network account is associated with the established network device; and transmitting a response to the query including an indication that the network account is associated with the established network device. In another aspect, the method may further include receiving an association communication including an indication that a new network device is associated with the network account. In another aspect, the query is received from a gateway on the network, and wherein the gateway is communicatively coupled to the new network device.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
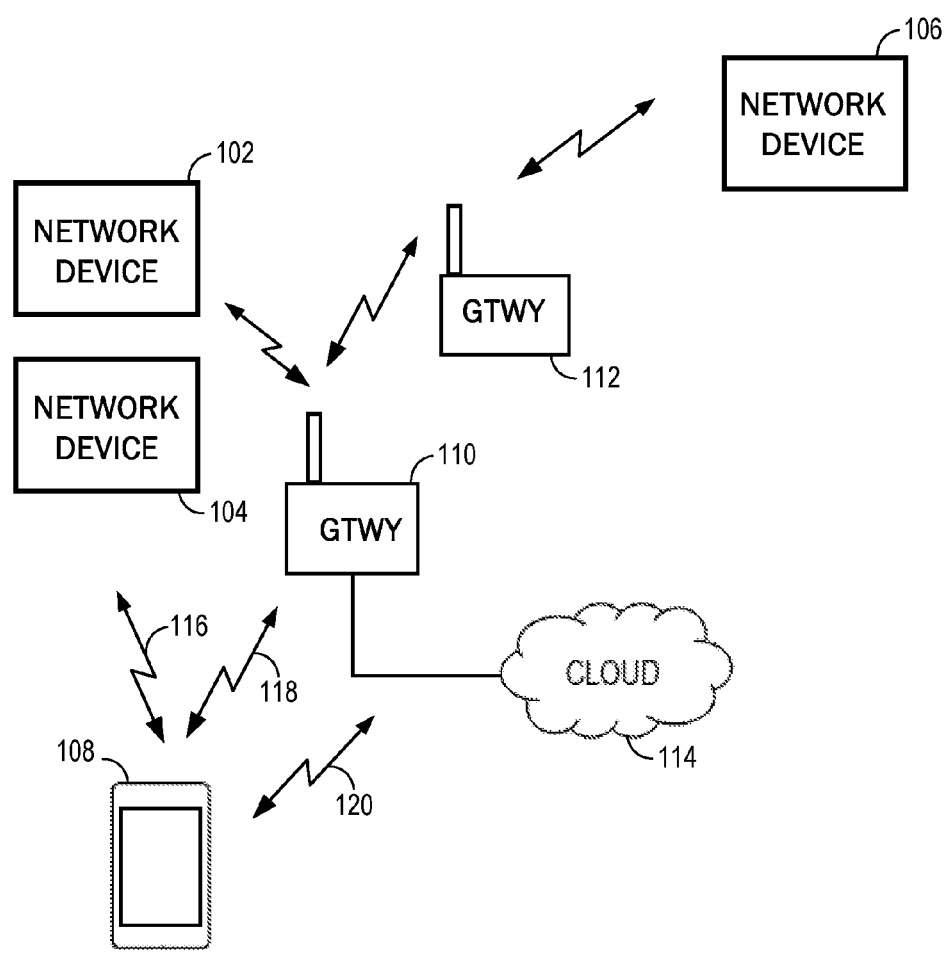
FIG. 1 is an illustration of an example of a wireless network environment, according to embodiments of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control one or more electronic devices (e.g., appliances) within an environment that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway. The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. The network device and the access device may then communicate with the cloud server using the network ID and the unique key generated for each device. Accordingly, the user may remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in other environments, such as a business, a school, an establishment, a park, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or the like), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to the external network 114 and may provide other gateways and devices in the local area network with access to the external network 114. The gateway 110 may be designated as a primary gateway. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The gateways 110 and 112 may also provide the access device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
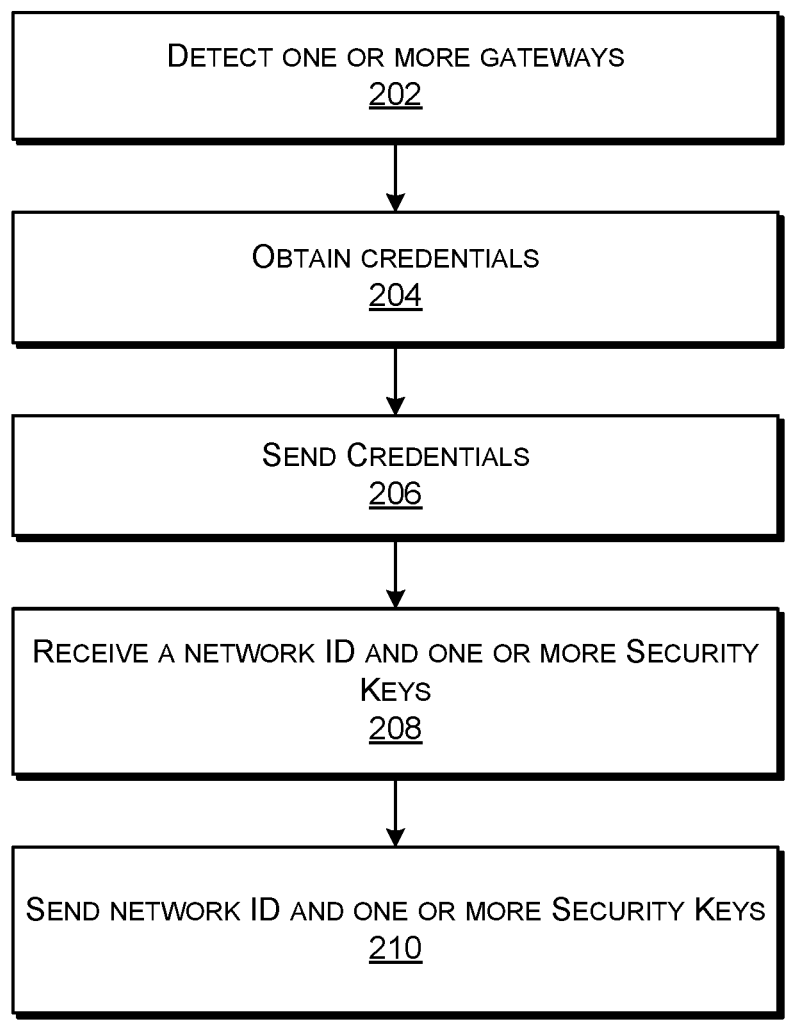
FIG. 2 is a flowchart illustrating an embodiment of a process for registering one or more network device, according to embodiments of the present invention.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alpha-numeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"fin"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the-network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered-on. In yet another example, the device can be a fan and the status can include a value corresponding to a speed of the fan on a scale of 0 to 100 when the fan is powered-on.

As described above, upon being powered on or reset, the-network devices 102 and/or 104 may be registered with the cloud network 114 and associated with a logical network within the local area network 100. Similarly, upon being powered or switched off or otherwise being disconnected from the network 100, the status of the-network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each-network device, or individual storage tables for each local area network or other subset of its network devices/networks. In one embodiment, a change in status may prompt the-network device to push its change in in status to the cloud network 114 for storage or updating of the cloud's stored status table. In another embodiment, cloud network 114 and/or gateway 110 may continuously (or periodically) communicate with each-network device to check to see if its status has changed.

In some embodiments, a network device (e.g. network device 102 and/or 104) may, upon connecting to the local area network 100, check the status of the-network devices on the network 100. In other embodiments, one-network device may check the status of one or more of the other network devices on the network 100. The network device may seek to check the status of another network device or access device for various reasons, including to display such status(es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if-network devices 102 and 104 were to each turn on and communicate their statuses to cloud network 114, cloud network 114 may analyze the status of network devices 102 and 104 and communicate to-network devices 102 and 104 that they are each connected to the same local area network 100.

Techniques and systems are described herein for new network device source entity triggered device configuration setup. Specifically, various techniques and systems are provided for efficient setup of an acquired device on a network using information generated by a new network device source entity during the acquisition of the new network device. More specifically, during or after the acquisition of a device from a source entity, the source entity (e.g. the via a source entity cloud) may transmit information regarding the device, the acquirer of the device, and other information regarding the new network device source entity acquisition to the manufacturer of the device or the company controlling the manufacture of the device, and/or to the network of the acquirer/user. That identification information may be used to pre-authorize or authenticate the device to join the network of the acquirer. As such, a gateway or another device on the network may be able to authenticate the device after it attempts to join the network using information stored locally, information stored at a cloud network, or by querying an external device (e.g. an access device). In other words, information identified at the source entity acquisition may be used to make the network familiar with the device before the device attempts to join the network in order to make the process of joining the network more efficient.

Figure 3:
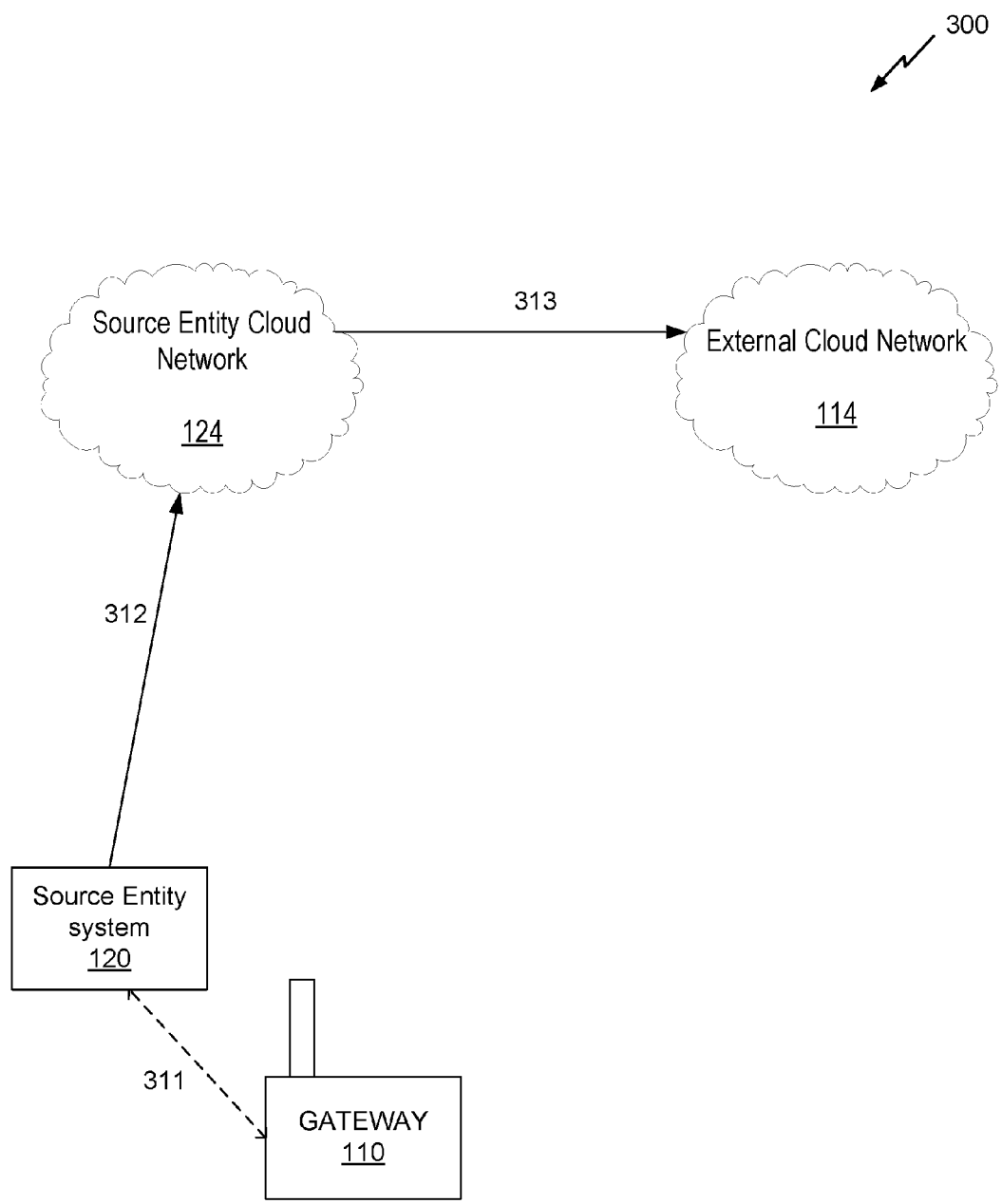
FIG. 3 illustrates an example of a system including a new network device source entity acquisition system, according to embodiments of the present invention.

FIG. 3 illustrates an example of a system 300 including a source entity acquisition system 120, according to embodiments of the present invention. The system 300 includes source acquisition entity system 120, source entity cloud network 124, and external cloud network 114.

System 300 includes cloud network 114. As noted, cloud network 114 may include a cloud infrastructure system that provides cloud services, which may include a host of services that are made available to users of the cloud infrastructure system on demand and that can dynamically scale to meet the needs of its user. For example, the cloud network 114 may host an application, and a user may, via a communication network such as the Internet, on demand, order and use the application. More specifically, a user or company may use cloud network 114 to store data, applications, etc. For example, if external cloud network 114 is hosted and used by a company that provides electronic devices, the company may use external cloud network 114 to source entity acquisition information, item/service information (serial numbers, etc.), frequent user program information, information associated with the method the acquirer used to acquire the item(s), among many other types of information.

System 300 includes cloud network 124. Source entity cloud network 124 may have similar capabilities to cloud network 114, but may be a part of the internal network of a source entity. For example, a source entity may use source entity cloud network 124 to hold data for their users, for example users of the source entity's physical or virtual locations. Similar to source entity cloud network 124, external cloud network 114 may provide cloud services, which may be made available to users of the source entity cloud's infrastructure system on demand and that can dynamically scale to meet the needs of its users. For example, source entity cloud network 124 may be used to store information obtained in the source entity's physical or virtual location at source entity acquisition system 120, such as acquisition information, acquisition processing information (e.g. how the user acquired the item), object/device information (e.g. how many of them the source entity has left), among others. Source entity cloud network 124 may also be used to store information related to other source entity-related information, such as user/acquirer information, user/acquirer account information, frequent user program/account information, and any other information related to the source entity (e.g. devices and services they provide, etc.). Furthermore, source entity cloud network 124 may also be used to hold information related to the manufacturers or other third party entities that have a predetermined relationship with the source entity and/the items/services such as information associated with the manufacturer's External Cloud 114, API's associated with the External Cloud 114, any security keys or other authentication information required to conduct acquisitions between Source entity cloud 124 and external cloud 114, or other data.

System 300 includes source entity acquisition system 120. Source entity system 120 may be a system in a physical or virtual source entity location where an object (e.g. network device) or service acquisition is completed. For example, source entity system 120 may include the point (e.g. pos device) at which a user completes an acquisition. However, such a source entity acquisition system may be in use in situations where the user is located somewhere other than in a physical or virtual (e.g. web site) location of the source entity. Such a virtual location, and the servers and other devices that support the virtual location, may serve as the source entity acquisition system for the source entity in such a situation. Further, any system by a source entity that allows a user to acquire an object or service may be used in accordance with embodiments of the present invention.

Source entity acquisition system 120 may have a relationship with source entity cloud network 124 as both source entity system 120 and source entity cloud network 124 are used by (and may be owned/run/hosted by) the same source entity. Therefore, any information obtained by source entity system 120 may be sent to source entity cloud network 124 for storage and/or backup. For example, when a user/acquirer initiates an acquisition by attempting to acquire an item at a source entity acquisition system of the source entity in the source entity's physical or virtual location (e.g. via communication/acquisition path 311), the data collected during the acquisition may be captured (e.g. via path 311) and/or stored by the source entity source entity acquisition system. During or subsequent to the item (or service) acquisition, the source entity system may transmit such acquisition data to source entity cloud network 124 to store and/or process the data. Source entity system 120 may also receive data from source entity cloud network 124 during and/or after an object or service acquisition. For example, as noted, source entity cloud network 124 may save/store user/acquirer information, user/acquirer account information, frequent user program/account information, among other data. During an acquisition, source entity system 120 may need such user/acquirer information to link the user/acquirer's acquisition to their account. Source entity system 120 may send a query to source entity cloud network 124 one or more times during an acquisition requesting source entity cloud network 124 to send requested information stored at source entity cloud network 124 to source entity system 120. Source entity cloud network 124 may respond to such a query by sending the requested information to source entity system 120 (after, for example, retrieving the requested data from storage). In another example, source entity system 120 may send/transmit a message to source entity cloud network 124 indicating that the user/acquirer has initiated an acquisition, causing source entity cloud network 124 to automatically send all information related to that user/acquirer to source entity system 120. Therefore, source entity system 120 and source entity cloud network 124 may communicate one or more times (and may communicate continuously) during an acquisition.

In an embodiment of the present invention, a user may initiate an acquisition to acquire gateway 110 at source entity acquisition system 120. Gateway 110 may be a router or proxy server or other device that routes between networks. However, as discussed further herein, a user may initiate an acquisition to acquire a variety of other types of devices at source entity acquisition system 120 according to different exemplary embodiments of the present invention. During or after the acquisition, source entity system 120 may obtain device information from gateway 110, such as the serial number, barcode, or other identifying information. Source entity system 120 may use the identifying information to obtain the price of gateway 110 or other information necessary to complete the acquisition of the gateway 110 for the acquirer. Source entity system 120 may use such item/object/service (e.g. network device) information during the acquisition, and may also send the item/object/service information to source entity cloud network 124 on communication path 312 (e.g. wireless communication via the Internet). Source entity system 120 may also obtain information regarding the user/acquirer, such as the user/acquirer's name, address, telephone number, acquisition information, frequent user program account information, among other data. Source entity system 120 may use such user/acquirer information during the acquisition, and may also send the user/acquirer information to source entity cloud network 124 on communication path 312 (e.g. wireless communication via the Internet). Source entity cloud network 124 may then store the device and/or user/acquirer information as received by source entity system 120. Source entity cloud network 124 may also receive (and then store) various other information from source entity system 120 regarding the user/acquirer, the devices acquired, and the acquisition itself during which the user acquired the devices.

External cloud network 114 may, as noted, store data, applications, etc., such as to save user information, item (e.g. object or service) information (serial numbers, etc.), frequent user program information, acquisition information, among many other types of information. In exemplary embodiments of the present invention, external cloud network 114 may be used by a company that produced gateway 110, distributed gateway 110 to the source entity, or otherwise has a predetermined relationship with and/or knowledge about gateway 110. For example, external cloud network 114 may be used/operated by a the company that produced/manufactured gateway 110, and therefore external cloud network 114 may have stored a list or database of all items it produced/manufactured (e.g. new network device), their specifications, and/or other information about the items.

It should be appreciated that although gateway 110 may be acquired by a user/acquirer and subsequently join/start a network (after which, for example, other devices may join the network), other devices other than a gateway may replace gateway 110. For example, other devices that allow for network devices to connect with external networks/devices, and/or other devices that allow external networks/devices to connect with network devices, may be used.

Furthermore, source entity cloud network 124 may have a predetermined relationship with external cloud network 114. For example, source entity cloud network 124 and external cloud network 114 may have an established relationship via cloud-to-cloud API. However, other types of relationships are also within the scope of exemplary embodiments of the present invention. For example, source entity cloud network 124 and external cloud network 114 may have a predetermined relationship such that source entity cloud network 124 sends device and user/acquirer information to external cloud network 114 any time the acquired device is associated with external cloud network 114 (e.g. device was produced/manufactured by the company that uses/owns/runs external cloud network 114). The relationship between source entity cloud network 124 and external cloud network 114 may be even more specifically controlled such that source entity cloud network 124 notifies external cloud network 114 about only certain subsets of items/services and/or users known by source entity cloud network 124 (e.g. network device acquired at source entity system 120.

New network device source entity cloud network 124 may, for example, have a predetermined relationship with external cloud network 114 such that source entity cloud network 124 and external cloud network 114 may send information to each other on a periodic basis. For example, source entity cloud network 124 may transmit, via communication path 313 (e.g. wireless communication via the Internet), any information received by it from source entity system 120, such as information about gateway 110 and a user/acquirer that acquired gateway 110, to external cloud network 114. External cloud network 114 may, by receiving item/acquisition and user/acquirer information from source entity cloud network 124, communicate with gateway 110 itself and/or with a network associated with the user/acquirer so as to prepare that network for gateway 110, which will be discussed further with respect to FIG. 4.

Figure 4:
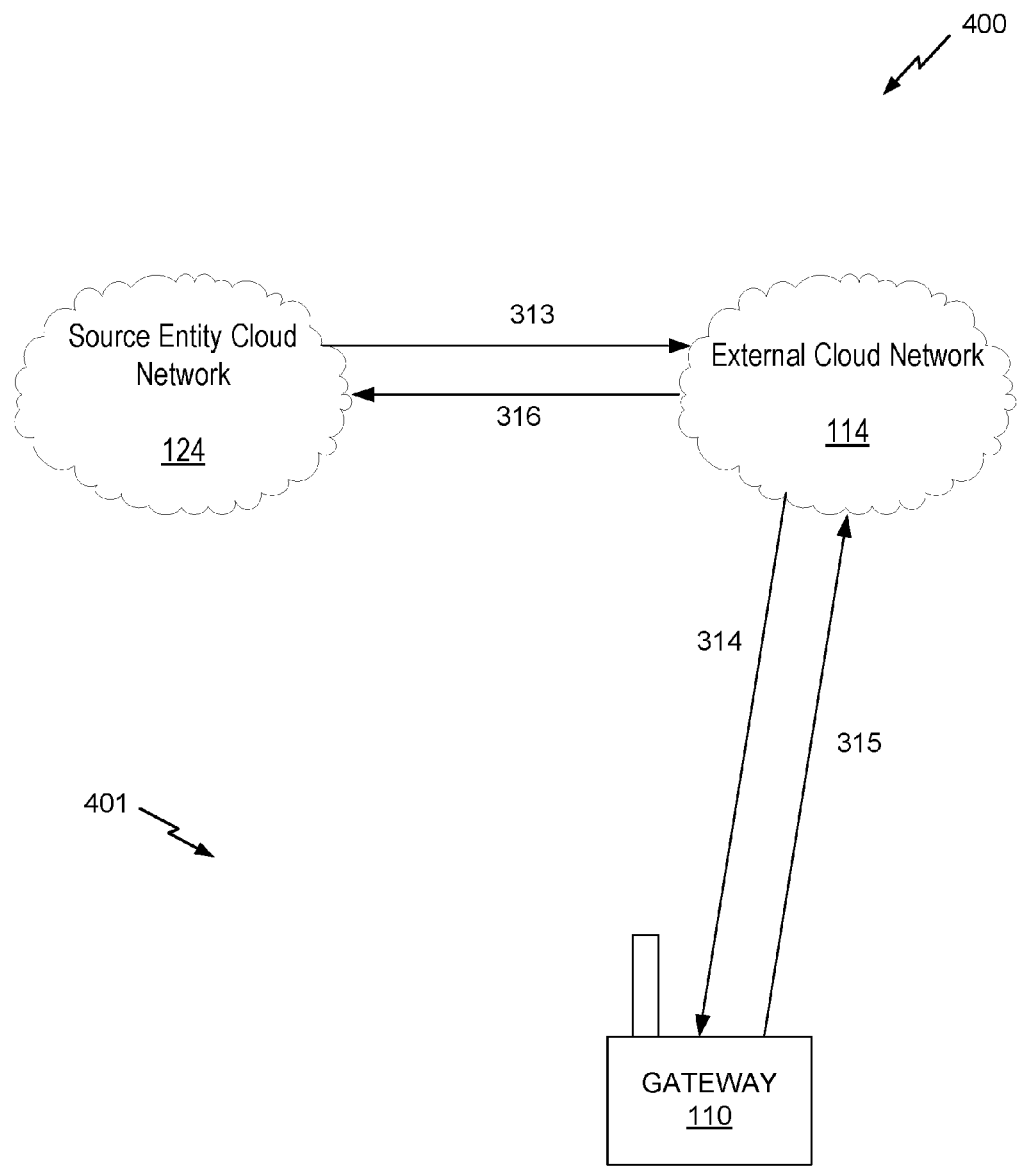
FIG. 4 illustrates an example of a system including a user local area network system, according to embodiments of the present invention.

FIG. 4 illustrates an example of a system 400 including a user/acquirer local area network system 401, according to embodiments of the present invention. The system 400 includes source entity cloud network 124, external cloud network 114, and user/acquirer home network 401, which includes gateway 110. Subsequent to an acquisition being completed for gateway 110, the user may use the gateway 110 in conjunction with a local area network, such as local area network 401. Local area network 401 may be located at the user's home, office, vacation home, or any of a variety of other locations. For example, gateway 110 may be used by the user/acquirer as a gateway (e.g. router) on their home local area network. More specifically, gateway 110 may provide external devices (e.g. cloud network, access device e.g. mobile phone, or other external devices/networks) with access to devices on the local area network 401. Furthermore, gateway 110 may be utilized for allowing network devices on the local area network to access other devices on the same network, external devices and/or networks via the Internet or other media.

Although the embodiments of the present invention may be described as implemented using WiFi, other communication protocols/methods may also be used (e.g. for communication within a local area network or between networks). For example, other types include Bluetooth® signals, Zigbee® signals, Ultra-Wideband (UWB) signals, and/or the like.

As noted with respect to FIG. 3, source entity cloud network 124 may transmit, via communication path 313 (e.g. wireless communication via the Internet), any information received by it from source entity system 120, such as information about gateway 110 and a user/acquirer that acquired gateway 110, to external cloud network 114. Source entity cloud network 124 may also transmit any other information that the source entity cloud 124 may have that may be of relevance/use to external cloud 114. After gateway 110 has been connected to local area network 401 (and therefore to external cloud network 114), external cloud network 114, upon receiving device and/or user/acquirer information from source entity cloud network 124 related to a device acquisition at source entity system 120, may transmit/send such information to gateway 110 (e.g. via communication path 314). External cloud network 114 may understand how to communicate with gateway 110 because it may have information about gateway 110 stored. For example, the same company may have produced/manufactured gateway 110 and also may use external cloud network 114 to communicate with source entity cloud network 124, for storage, and for other uses. In other words, the company may have stored identification and/or other information about gateway 110 at external cloud network 114 (or at other external storage) upon production of gateway 110, and then may have matched the information received about the device from source entity cloud network 124 such that the external cloud network knew which of its items/services (e.g. new network device) were acquired by the user/acquirer. Gateway 110 may receive any information sent by external cloud network 114, such as item/service/user information, upon powering up after the user begins use of the gateway.

Source entity system 120 (or another network or network device, such as external cloud network 114 or source entity cloud network 124) may communicate with gateway 110 before gateway 110 is authenticated on and joined/connected to a network if, for example, gateway 110 is capable of communicating with other devices without having power. For example, network device 502 may be capable of communicating with source entity acquisition system 120 if gateway 110 is capable of communicating via methods other than via WiFi, such as via mobile telecommunications technology (e.g. 4G, 3G, etc.), near-field communication (NFC), radio-frequency identification (RFID), among other possible technologies. Furthermore, gateway 110 may include a writeable chip that does not require direct contact or power for communication. For example, similar chip may be found in an exemplary source entity system 120 such that source entity acquisition system 120 and gateway 110 may communicate via NFC.

Before gateway 110 is allowed to join the network and before it receives any device or any other information from external cloud network 114, gateway 110 or external cloud network 114 may transmit a communication (e.g. query) to an access device and/or a user to obtain approval or authentication for gateway 110 to join the network. The user and/or access device (e.g. after receiving an input from the user) may transmit a response back to the gateway 110 and/or cloud network 114 including an indication of whether gateway 110 is allowed/authenticated to join the network. Such an approval process may be for security purposes so that no sensitive/personal information is sent to a device that is not authenticated to be a part of the local area network.

After gateway 110 powers up and receives information from external cloud network 114, gateway 110 may send a communication, for example via communication path 315, back to external cloud network 114. Such a communication sent by gateway 110 to external cloud network 114 may include an acknowledgement of the information received from external cloud network 114 (or a communication to the cloud network 114 that a new network has been established and associated with, for example, the same user who controls network 401). Such a communication sent by gateway 110 to external cloud network 114 may also include a request for gateway 110 to create an account with external cloud network 114. Such an account may allow gateway 110 to register itself with external cloud network 114 so that external cloud network 114, and therefore the company using external cloud network 114, may know the existence of and location of gateway 110 such that external cloud network 114 may be able to communicate with gateway 110 over time. The process of setup for gateway 110 (including, for example, registration with external cloud 114 and/or setting up an account with external cloud 114) may be more efficient because of the user/acquirer and/or item/service information sent from source entity cloud 124 to external cloud network 114, and subsequently (after gateway 110 has been connected to the network) the information sent from external cloud network 114 to gateway 110 based on that user/acquirer and/or item/service information. In other words, gateway 110 may be more easily/efficiently set up within local area network 401 because of item/service or user/acquirer information sent to it by external cloud network 114.

External cloud network 114 may send a communication back to gateway 110 to acknowledge the communication sent by gateway 110 including its request to register and/or for an account with external cloud network 114. An exemplary acknowledgement may include language such as "you are configured for activation portal". The communication from external cloud network 114 to gateway 110 may also include information regarding the account for gateway 110, including login or other credentials. External cloud network 114 may also send a communication to source entity cloud network 124 including a notification that external cloud network 114 sent item/service or user/acquirer information to gateway 110 and/or that gateway 110 registered with external cloud 114. The communication from external cloud network 114 to source entity cloud network 124 may include a confirmation that gateway 110 has registered with external cloud network 114. External cloud network 114 may send such a communication to source entity cloud network 124 after gateway 110 sends an acknowledgement to external cloud 114 that gateway 110 received information from external cloud network 114 and/or after gateway 110 sends a communication to external cloud network 114 to register an account with external cloud network 114.

One of the devices within system 400, such as source entity cloud network 124, external cloud network 114, or gateway 110 may send a message to the item/service or user/acquirer who acquired gateway 110 to indicate to the user that gateway 110 has been set up and/or activated with external cloud network 114. Such a message may be in the form of an SMS message or any other type of message that may allow a device on the network to communicate with the user. A device on system 400 may be sent to, for example, an access device (e.g. smart phone or other mobile device) of the user.

The process described herein, including the source entity network (e.g. source entity cloud network) sharing information received from the source entity's acquisition system and other information related to the source entity's users and the item/service that they are acquiring may be beneficial for both the source entity and the user/acquirer. Sharing such information with a an external cloud network owned by the manufacturer of the item/service allows the company to facilitate efficient setup of the item when it is turned on the user/acquirer's network. For example, as described herein, external cloud network 114 was able to utilize information about a user/acquirer of the source entity and an item that the user acquired (an item, for example, being produced by the company) to help gateway 110 to set up on the user/acquirer's network more efficiently and with fewer steps than would otherwise have been required. Such a sharing of information from the source entity to such an external network may also benefit the source entity because, due to such item setup efficiencies, the user/acquirer may choose to acquire future items from that source entity due to the relationship between the source entity and the external network and/or the company associated with the external network.

Figure 5:
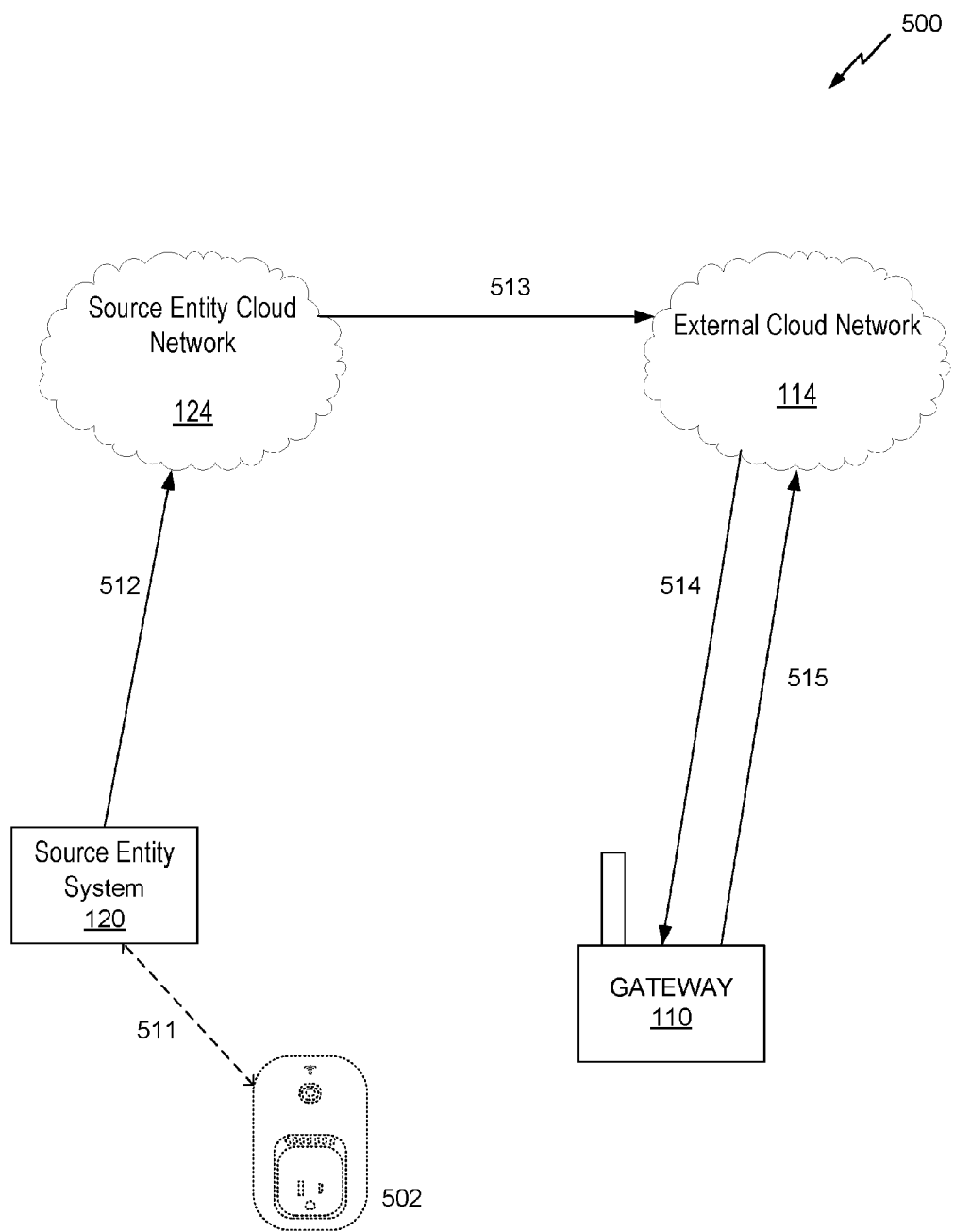
FIG. 5 illustrates an example of a system including a new network device source entity acquisition system, a source entity cloud network, an external cloud network, and a gateway, according to embodiments of the present invention.

FIG. 5 illustrates an example of a system 500 including a source entity source entity system 120, source entity cloud network 124, external cloud network 114, and gateway 110, according to embodiments of the present invention. The system 500 includes source entity system 120, source entity cloud network 124, external cloud network 114, and gateway 110. As described with respect to FIGS. 3 and 4, source entity system 120 may be a source entity acquisition system located in a physical or virtual location for a source entity and therefore connected to or in communication with source entity cloud network 124, and gateway 110 may be located within a local area network of a user/acquirer and registered with external cloud network 114.

Similar to gateway 110, the user may initiate an acquisition at the source entity, such as a network device 502, at source entity system 120 in the source entity's store or elsewhere. In some embodiments, the network device 502 may include a home automation network device that allows a user to access, control, and/or configure various home appliances located within the user's home, such as a television, radio, light, microwave, iron, and/or the like, as described further with respect to FIG. 1. As described further with respect to FIG. 6, upon being powered on or reset by the user after acquisition, the network device 502 may be registered with the cloud network 114.

During or after network device 502 is acquired at source entity system 120 by the user/acquirer, source entity system 120 may obtain device information from network device 502, such as the serial number, barcode, or other identifying information. Source entity system 120 may use the identifying information to obtain the price of network device 502 or other information necessary to complete the acquisition of the network device 502 for the user. Source entity system 120 may use such item/service information during the acquisition, and may also send the item/service or acquisition information to source entity cloud network 124 on communication path 512 (e.g. wireless communication via the Internet). Source entity system 120 may also obtain information regarding the user/acquirer, such as the user/acquirer's name, address, telephone number, acquisition information (what the acquirer used to acquire the device/item), frequent user program account information, among other data. Source entity system 120 may use such user/acquirer information during the source entity acquisition, and may also send the user/acquirer information to source entity cloud network 124 on communication path 512 (e.g. wireless communication via the Internet). Source entity cloud network 124 may then store the item and/or user/acquirer information as received by source entity system 120. Source entity cloud network 124 may also receive (and then store) various other information from source entity system 120 regarding the user/acquirer, the items acquired, and the acquisition itself during which the user/acquirer acquired the item(s).

As noted, source entity cloud network 124 may, for example, have a predetermined relationship with external cloud network 114 such that source entity cloud network 124 and external cloud network 114 may send information to each other on a periodic basis. For example, source entity cloud network 124 may transmit, via communication path 513 (e.g. wireless communication via the Internet), any information received by it from source entity system 120, such as information about network device 502 and a user/acquirer that acquired network device 502, to external cloud network 114. External cloud network 114 may, by receiving item (e.g. new network device) and user/acquirer information from source entity cloud network 124, communicate with network device 502 itself and/or with a network associated with the user/acquirer so as to prepare that network for network device 502.

As noted, during the setup of gateway 110 after gateway 110 was acquired, gateway 110 may send a request to register (and may subsequently receive confirmation of registration) and/or for an account with external cloud network 114. Upon receiving item and/or user/acquirer information from source entity cloud network 124 via communication path 513, external cloud network 114 may associate the acquired device (e.g. network device 502) with the account acquired by gateway 110 with external cloud network 114 because gateway 110 and network device 502 were acquired by the same user/acquirer and may join the same local area network. However, in alternative embodiments of the present invention, network device 502 may request and obtain its own registration and/or its own account information from external cloud network 114.

Figure 6:
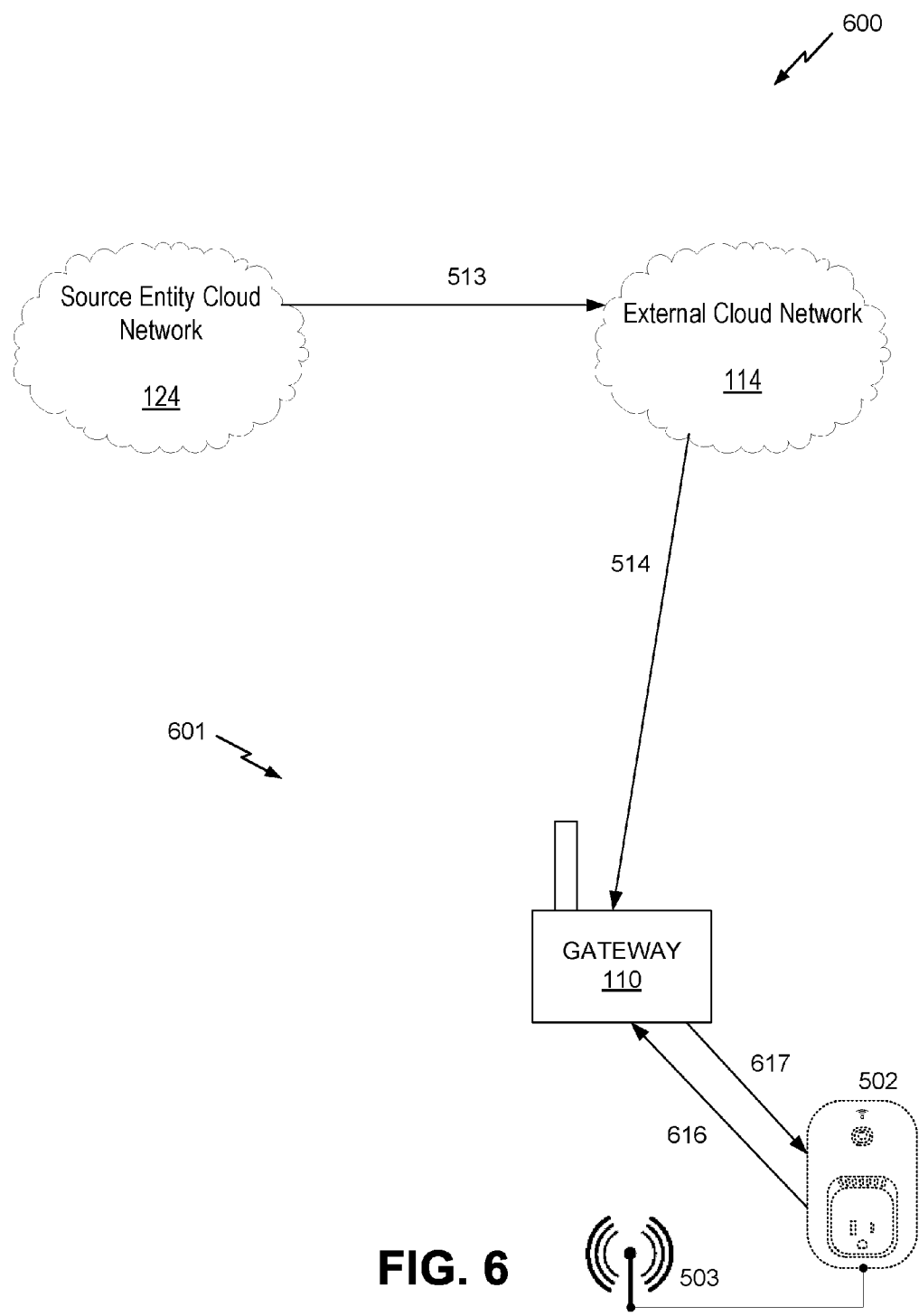
FIG. 6 illustrates an example of a system including a user local area network system, according to embodiments of the present invention.

FIG. 6 illustrates an example of a system 600 including a user/acquirer local area network system 601, according to embodiments of the present invention. The system 600 includes source entity cloud network 124, external cloud network 114, and user/acquirer home network 601, which includes gateway 110 and network device 502. Subsequent to the acquisition of network device 502 being completed, the user may use the network device 502 in conjunction with a local area network, such as local area network 601. Local area network 601 may be located at the user's home, office, vacation home, or any of a variety of other locations. For example, gateway 110 may be used by the user/acquirer as a gateway (e.g. router) on their home local area network, and the user/acquirer may attempt to connect network device 502 to gateway 110 on its local area network.

As noted with respect to FIG. 5, source entity cloud network 124 may transmit, via communication path 513 (e.g. wireless communication via the Internet), any information received by it from source entity system 120, such as information about network device 502 and a user/acquirer that acquired network device 502, to external cloud network 114. External cloud network 114, upon receiving item/service and/or user/acquirer information from source entity cloud network 124 related to a device acquisition at source entity system 120, may transmit/send such information to gateway 110 (e.g. via communication path 514). External cloud network 114 may know how to communicate with gateway 110 because it may have information about gateway 110, including its location on the local area network, stored (e.g. from the previous registration of gateway 110 with external cloud network 114). Instead of or in addition to sending item/service or user/acquirer information to gateway 110, external cloud network 114 may send a communication to gateway 110 including a pre-provision (i.e. approval, authentication, authorization, verification, certification, etc.) indicating to gateway 110 that the item acquired (e.g. network device 502) by the user/acquirer may join local area network 601 (i.e. may connect to gateway 110).

External cloud network 114 (or another network or network device, such as source entity system 120 or source entity cloud network 124) may communicate with network device 502 before network device 502 is authenticated on and joined/connected to a network if, for example, network device 502 is capable of communicating with other devices without having power. For example, network device 502 may be capable of communicating with external cloud network 114 if network device 502 is capable of communicating via methods other than via WiFi, such as via mobile telecommunications technology (e.g. 4G, 3G, etc.), near-field communication (NFC), radio-frequency identification (RFID), among other possible technologies. Certain technologies within such a network device may be capable of such communication, such as smartphones, tablets, e-readers, among others. Furthermore, network device 502 may include a writeable chip that does not require direct contact or power for communication. For example, similar chip may be found in an exemplary source entity system 120 such that source entity acquisition system 120 and network device 502 may communicate via NFC.

Instead of or in addition to sending item/service or user/acquirer information to gateway 110, including for example a pre-provisioning, external cloud network 114 may send a communication to network device 502 including information about the local area network, such as network credentials, login information, or any other information necessary to connect network device 502 to the network (e.g. if communicating via 4G, NFC, RFID, etc.). Network device 502 may receive any information sent by external cloud network 114 upon powering up and after the user begins use of the gateway. Sending device information (e.g. information about the acquired network device 502), user/acquirer information, and/or a pre-provisioning to gateway 110 may help network device 502 to join the network, and connect to gateway 110, more efficiently.

External cloud network 114 may send a communication to source entity cloud network 124 including a notification that external cloud network 114 sent a pre-provision for network device 502 to gateway 110. External cloud network 114 may send such a communication to source entity cloud network 124 after gateway 110 sends an acknowledgement to external cloud 114 that gateway 110 received pre-provision from external cloud network 114 and/or after network device 502 has connected to gateway 110. A notification may also be sent by gateway 110, or by network device 502, to external cloud network 114 and/or to source entity cloud network 124 (or to source entity cloud network 124 via external cloud network 114) indicating that network device 502 has joined local area network 601.

When network device 502 powers up, it may receive any information previously sent to it from external cloud network 114. Gateway 110 may send a communication back to external cloud network 114. Such a communication sent by gateway 110 to external cloud network 114 may include an acknowledgement of the information received from external cloud network 114. Upon powering up, network device may broadcast a notification/indication of its presence to the local area network. For example, network device 502 may generate a setup access point, such as setup access point 503. A setup access point, such as for example a wireless access point, is a device that allows wireless devices to connect to a network using WiFi or other standards. Setup access point 503 may allow gateway 110, after it receives notification or an indication that 502 is present, to connect to network device 502 via setup access point 503. Alternatively, network device 502 may, immediately after powering up, begin searching for an activation access point. Such an activation access point may be located at or connected to gateway 110. Network device 502 may also send, via communication path 616) to gateway 110 its credentials (i.e. private information, such as its SSID and/or MAC address or other identifying information) with a query including a request to join local area network 601.

After gateway 110 receives a request to join the local area network, gateway 110 may authenticate network device 502 by confirming that network device 502 is allowed to join the network. Such authentication will be discussed further with respect to FIG. 7. After network device 502 has been authenticated, gateway 110 may transmit, via communication path 617) network credentials to network device 502 to allow network device 502 to join the local area network. After receiving the network credentials, network device 502 may (attempt to) join local area network 601.

The process of setup for network device 502 may be more efficient because of the user/acquirer and/or object/service information sent from source entity cloud 124 to external cloud network 114, and subsequently the pre-provisioning information sent from external cloud network 114 to gateway 110 based on that user/acquirer and/or object/service information. In other words, gateway 110 may be more easily/efficiently set up within local area network 401 because of the pre-provisioning information sent to it by external cloud network 114. For example, the information it received may allow it to recognize network device 502 more easily/quickly, may allow it to obtain credentials to send to network device 502 so network device has the credentials immediately upon powering up, among other examples.

One of the devices within system 600, such as source entity cloud network 124, external cloud network 114, gateway 110, or network device 502, may send a message to the user who acquired network device 502 to indicate to the user/acquirer that network device 502 has joined local area network 601. Such a message may be in the form of an SMS message or any other type of message that may allow a device on the network to communicate with the user. A device on system 600 may be sent to, for example, an access device (e.g. smart phone or other mobile device) of the user.

As noted, an acquired item (e.g. new network device 502) may have a predetermined relationship with external cloud network 114 and/or a local area network. For example, the network device may be produced/manufactured by the company that uses/owns/runs external cloud network 114. Furthermore, the device may be acquired by a user/acquirer who then introduces the device to a local area network owned/used by the user/acquirer. In an exemplary embodiment of the present invention, however, the acquired device may not be directly associated with the local area network that it is introduced to. For example, a user/acquirer may acquire the device, and then gift the device to a third party so as to allow the third party to introduce the device (e.g. power up the device within range of the local area network) to a different local area network (e.g. a local area network used/controlled by the third party, such as a local area network at the third party's home) such that the acquired/new network device may never attempt to join any of the user/acquirer's networks. In such a situation, the source entity and/or external cloud network may still send pre-provisioning or authorization information to gateway 110, or in other words to the local area network owned/controlled by the acquirer. However, the acquired device would be powered up on a different local area network, and may begin to search for an activation access point at the gateway of that network. The acquired device or a different device on the third party's local area network may send a communication/query to the third party, or the recipient of the network device, to verify whether the third party would like to authorize the new device to join its network. Such a communication may read, for example, "this device wasn't acquired by you—do you allow the device to join your network?" Such a communication may be sent to an access or other device controlled by the third party. A communication may also be sent to the user/acquirer to ask the acquirer whether or not to allow the third party to connect the new device to the third party's network (on the other hand, the acquirer may not be notified about the new network device (e.g. network device 502) attempting to join the recipient's network). In other words, in such a gifting situation, a query may be sent to one of the parties involved in the gifting acquisition to clarify/confirm the location of the new device and/or to authorize the new network device joining a network associated with the giftee and/or the giftor.

In another embodiment of the present invention, multiple local area networks, similar to or different than, for example, local area networks 401 and/or 601, may exist. For example, the multiple local area networks may all be associated with the user/acquirer or acquirer of the new network device (e.g. network device 502). External cloud network 114 may not know which local area network, or more specifically which gateway (such as gateway 110) on which local area network, to send pre-provisioning/authorization information regarding the new network device. In such a situation, the external cloud network 114 may be selected/set to perform a variety of different possible options. For example, external cloud network 114 may send pre-authorization information associated with the new network device to all networks/gateways, or some predetermined subset of those networks/gateways. Alternatively, the network 114 may send a communication/query to the user to request input regarding which networks/gateways to send such pre-authorization information. Alternatively, a source entity acquisition system, such as source entity system 120, may prompt a user during the user's initiated acquisition which one or more networks, chosen from a list of networks associated with the user/acquirer as known by the source entity, the user/acquirer would like the new network device to join or otherwise be associated with. After the user/acquirer chooses one or more networks, the source entity cloud network 124 and/or the external cloud network 114 may send pre-authorization information to devices/gateways on those selected networks. In other words, in such exemplary embodiments, the intent of the user regarding their acquired device may be known at the time of acquisition. Further, the user may choose to have pre-authorization information sent to any new gateway or network device about all or a subset of all devices on the network. Such a setting may cause the entrance of a new gateway onto a network (or to a newly developed local area network) more efficient by providing it with information about all network devices that may connect to it in the future.

In another embodiment of the present invention, a gateway on a local area network associated with a user/acquirer of a new network device may be set to periodically check to see if any new devices have been acquired by the user. If one has, the gateway may request information about the new network device from the source entity. The source entity may subsequently send one or more data (e.g. tokens with information), directly to the gateway within the local area network, including information associated with the new network device (e.g. network device 502).

Figure 7:
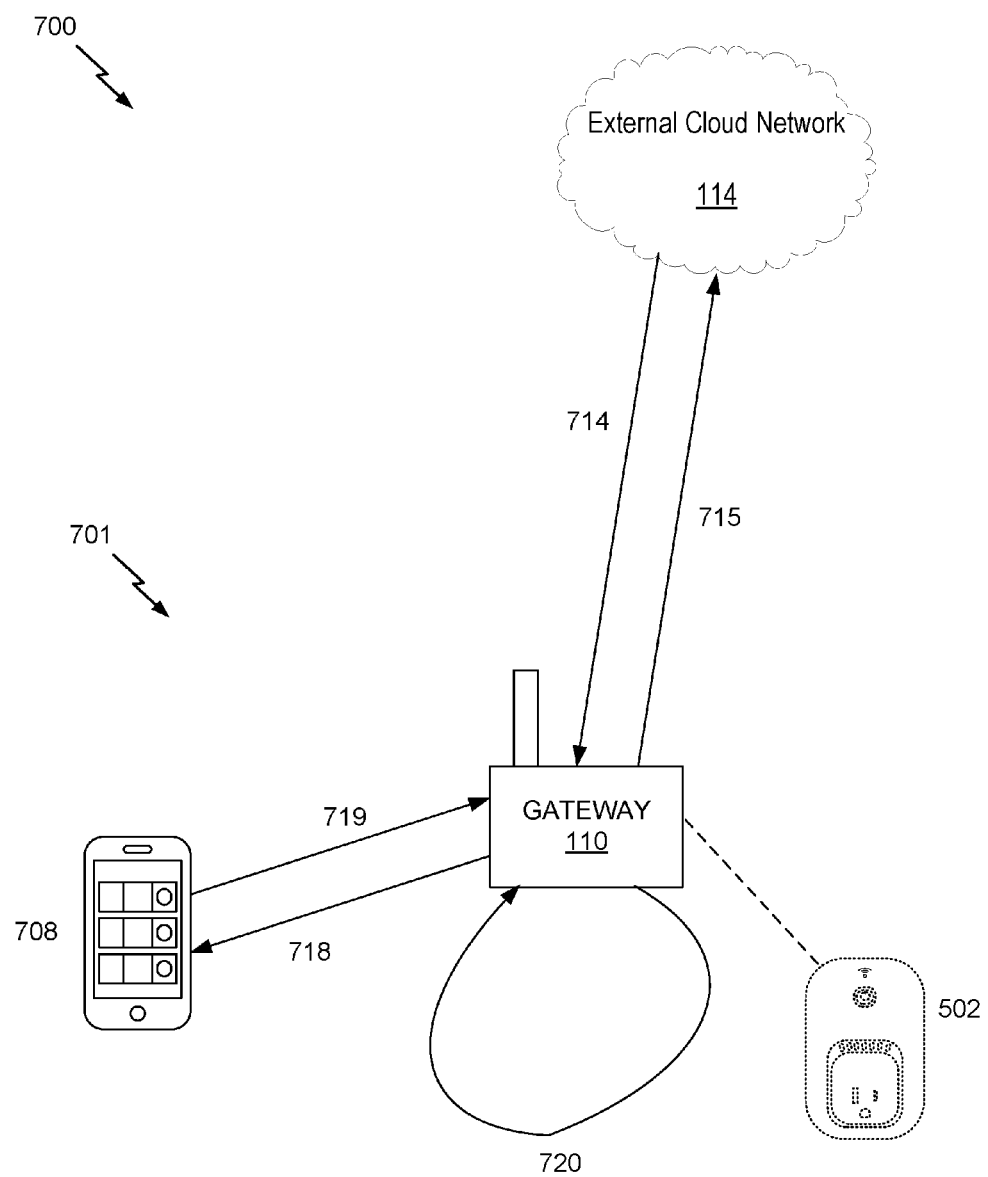
FIG. 7 illustrates an example of a system including a user local area network system, according to embodiments of the present invention.

FIG. 7 illustrates an example of a system 700 including a user/acquirer local area network system 701, according to embodiments of the present invention. The system 700 includes external cloud network 114 and local area network 701. Local area network 701 includes gateway 110, network device 502, and access device 708.

As noted, after gateway 110 receives a request to join the local area network, gateway 110 may authenticate network device 502 by confirming that network device 502 is allowed to join the network. For example, gateway 110 may have previously stored authentication information related to network device 502. For example, external cloud network 114, upon receiving device and/or user or acquirer information from source entity cloud network 124 related to a device acquisition at source entity system 120, may have transmitted/sent information related to network device 502 to gateway 110. Such information, received by gateway 110, may include device and user/acquirer information related to the user/acquirer that acquired a device, such as network device 502, at a source entity. However, in certain embodiments of the present invention, different source entities may have provided the different devices (although the source entities may have a relationship such that the source entities communicate with each other regarding acquisitions of such devices). Such information may also include pre-provisioning/authentication information indicating to gateway 110 that network device 502 is allowed to join local area network 701. For example, network device 502 may be authenticated because, based on the information received by external cloud 114 from the source entity (cloud), network device 502 was acquired by the same user/acquirer as who acquired gateway 110 and/or another network device, and such user, item/object, or acquisition information was mapped together based on such acquisitions over time. Therefore, gateway 110 may simply query a storage device within gateway 110 or elsewhere within gateway 110 to confirm that network device 502 is authenticated to join local area network 701.

However, if gateway 110 does not have local information stored to indicate that network device 502 is authenticated, gateway 110 may capture such authentication information in a different way. For example, gateway 110 may send/transmit a query to external cloud network 114, via communication path 715, including a request for external cloud 114 to indicate to gateway 110 whether network device 502 should be allowed/authenticated to join local area network 701. External cloud network 114 may have stored such authentication information because it may have received such information from the source entity (e.g. from source entity cloud network 124). Alternatively, external cloud network 114 may have received user or item/service information and compared such information to previously received user or item/service information such that it knows that a certain user acquired multiple devices that are capable of connecting to each other and/or to the same local area network (e.g. local area network 701) of the user/acquirer. External cloud network 114 may transmit/send a response, e.g. via communication path 714, to the query from gateway 110 including information indicating whether or not network device 502 is authenticated to join local area network 701.

Gateway 110 may also send/transmit a query to access device 708, via communication path 718, including a request for access device 708 to indicate to gateway 110 whether network device 502 should be allowed/authenticated to join local area network 701. For example, gateway 110 may transmit a query, via communication path 718, to access device 708 including a request for access device 708 to indicate to gateway 110 whether network device 502 should be allowed/authenticated to join local area network 701. Access device 708 may present, e.g. on a display of access device 708, the query or a similar query to a user of the access device. For example, the user of access device 708 may be the same user/acquirer who acquired network device 502 (and, for example, who acquired gateway 110) from the source entity. A user may select an answer to the query on access device 708, and access device 708 may transmit, e.g. via communication path 719, an answer to the query to gateway 110. In embodiments of the present invention, gateway 110 may also use a combination of its own storage, external cloud 114, and access device 708 (and user) to establish authentication of network device 502 before network device 502 joins the network.

However, a user may also select an option for gateway 110 to not require authentication to allow a device, such as network device 502, to join local area network 701. For example, gateway 110 may include settings such that gateway 110 may allow, without authentication, any device or a subset of all devices to connect to gateway 110 and/or join local area network 701.

As noted, network device 502 may connect to gateway 110 after network device 502 is authenticated by gateway 110 using one of several processes of authentication. However, if more than one gateway exists within proximity of network device 502 when network device 502 is turned on or powered up, network device 502 may connect to a gateway other than gateway 110. For example, if two gateways (e.g. gateway 110 and a second gateway, not shown) are in the proximity of network device 502, network device 502 may connect to the first gateway to communicate and adopt it onto its network. Such a situation may be undesirable if one of the gateways is owned/controlled by someone other than the acquirer/user of network device 502. Therefore, network device 502 may perform a second step of authentication before it connects to network 701. More specifically, after gateway 110 has authenticated network device 502 to confirm that network device 502 should be allowed to join network 701, network device 502 may authenticate gateway 110 (or network 701 as a whole) to confirm that network 701 is the network that it should be connecting to. For example, network device 502 may authenticate gateway 110 (or network 701 as a whole) to confirm that network 701 is owned/controlled by the same user or entity that acquired and owns/controls network device 502.

As noted, network device 502 may generate a setup access point, such as setup access point 503, and after gateway 110 connects to the access point, network device 502 may transmit (via communication path 616, as shown in FIG. 6) information/data identifying the device, credentials (i.e. private information, such as its SSID and/or MAC address, serial number, or other uniquely identifying information), and/or other information to gateway 110 with a query including a request to join local area network 601. For example, network device 502 may transmit the same or similar information to gateway 110 as gateway 110 had previously received from external cloud network 114 (i.e. the information received by external cloud network 114 from source entity cloud network 124). The information sent from network device 502 to gateway 110 may be sufficient information about network device 502 such that gateway 110 may compare that information to the information it already has stored (as received previously from external cloud network 114) to authenticate network device 502. However, network device 502 may choose to only transmit a subset of the information that it would otherwise have sent to gateway 110 (or a subset of the information that the gateway 110 had previously received from external cloud network 114). The information sent from network device 502 to gateway 110 may still be sufficient information about network device 502 such that gateway 110 may compare that information to the information it already has stored. For example, gateway 110 may only need to compare one piece of identification information (e.g. one characteristic) about network device 502 to confirm that network device 502 is authenticated/allowed to join network 701. In order to authenticate network 701 (after, for example, gateway 110 has already authenticated network device 502), network device 502 may transmit a request or query to gateway 110 for a piece/data of the information that it did not transmit to gateway 110. In other words, network device 502 may request that gateway 110 confirm a piece of information/data about network device 502 that gateway 110 may only have been able to receive/obtain from source entity cloud network 124 (e.g. via external cloud network 114) previously after network device 502 was acquired or otherwise acquired from the source entity. The information retained (and not sent to gateway 110) by network device 502 may include information that should have been known by source entity system 120, and therefore source entity cloud 124 and external cloud network 114, at the time that network device 502 was acquired. If gateway 110 is able to respond to network device 502 with the correct information/data in response to the request/query from network device 502, then network device 502 can confirm that network 701 (and gateway 110) is the correct network that it is meant to connect to, or that is controlled by the same user/entity that controls network device 502. If, however, gateway 110 is unable to respond to network device 502 with the correct information/data in response to its request/query, then network device 502 may determine that the network that is trying to connect to network device 502 is a foreign or third party network, and it may choose to refrain from connecting to that network. More specifically, network device 502 may then choose to refrain from connecting to a network even though that network has authenticated network device 502 to connect to the network.

Figure 8:
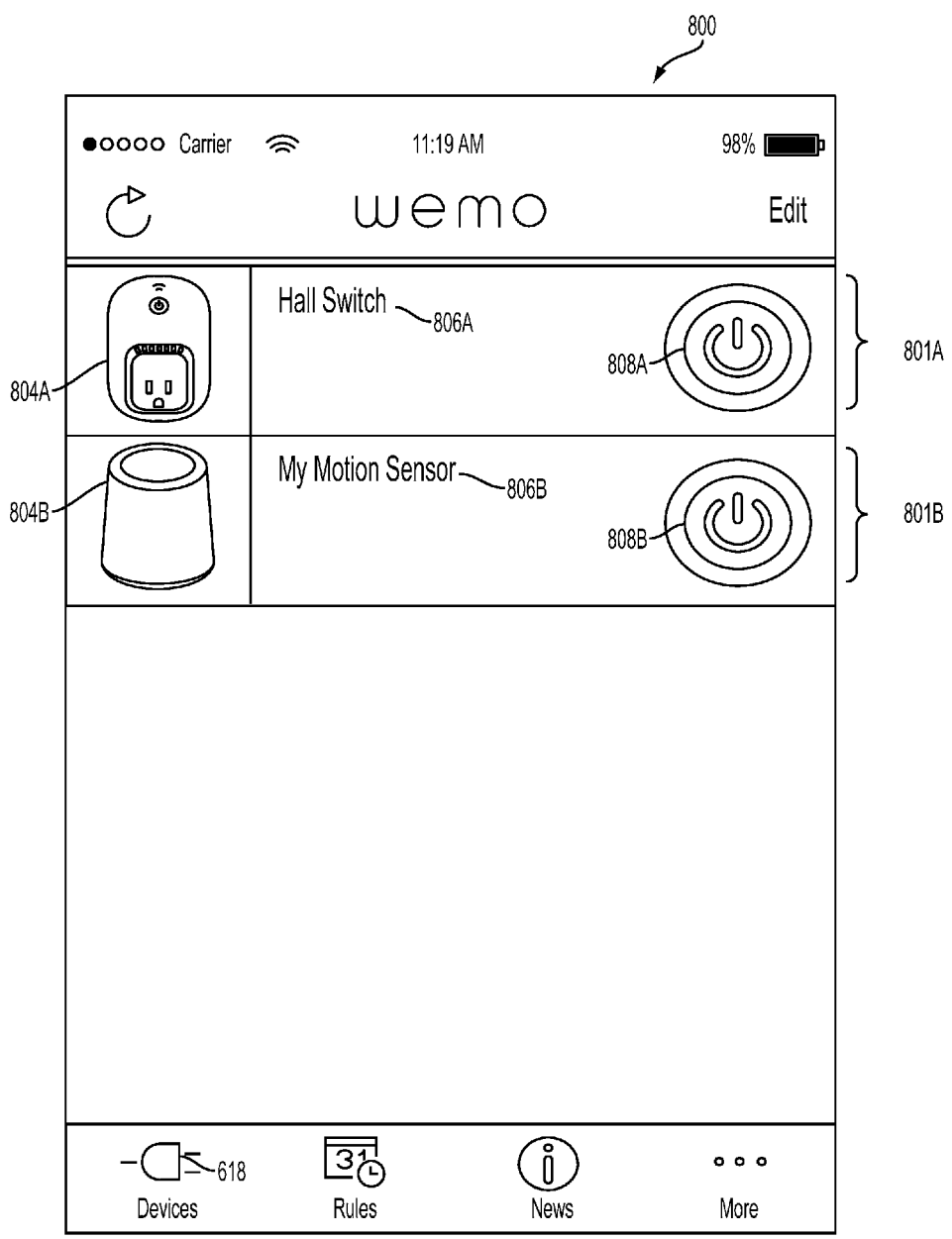
FIG. 8 illustrates an exemplary user interface display for an application on an access device, according to embodiments of the present invention.
Figure 9:
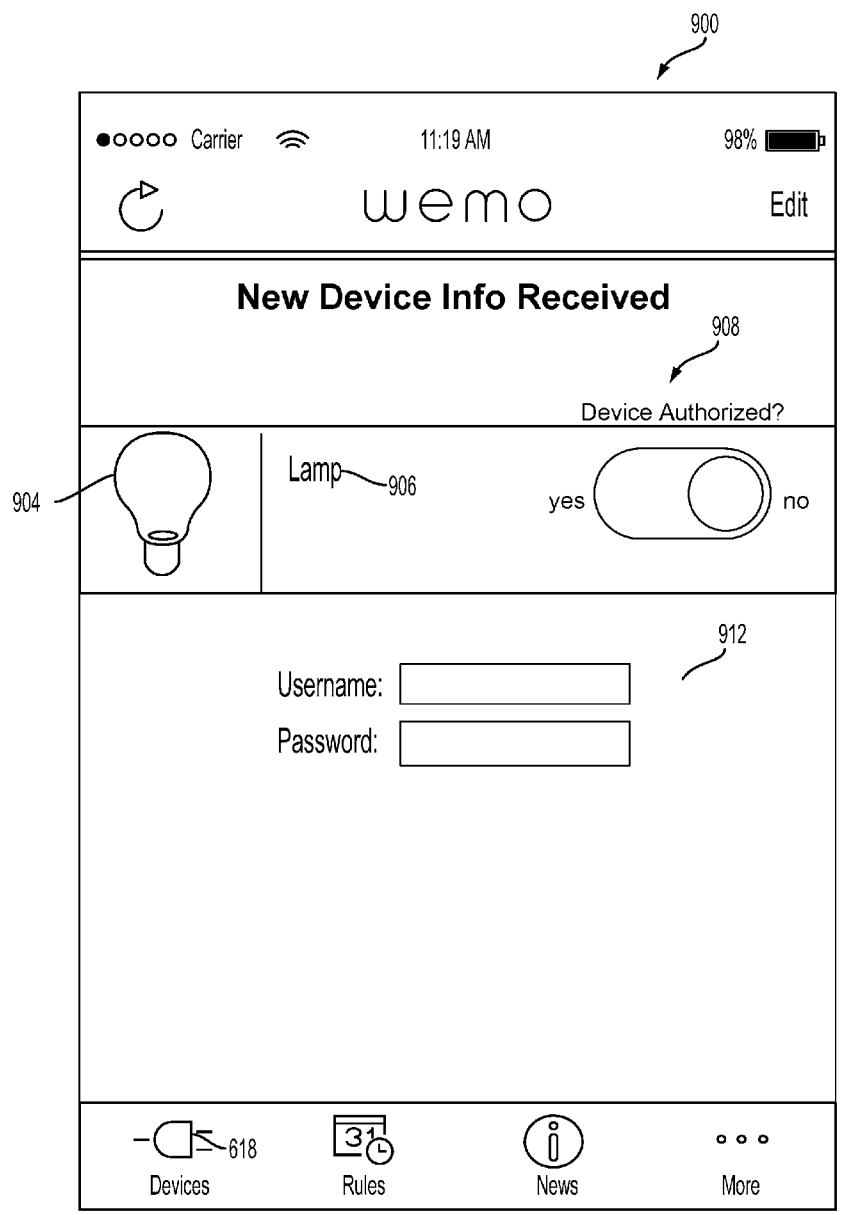
FIG. 9 illustrates an exemplary user interface display for an application on an access device, according to embodiments of the present invention.
Figure 10:
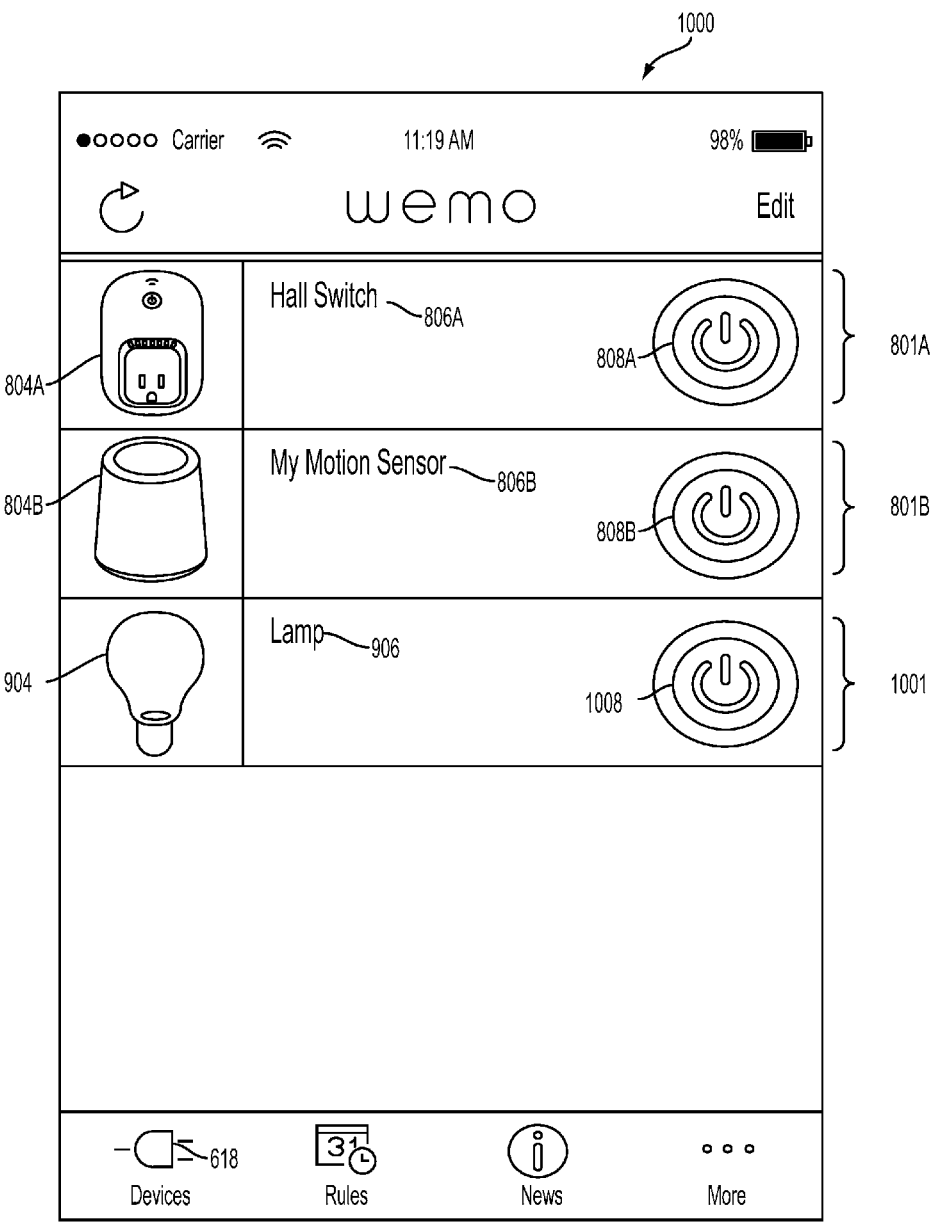
FIG. 10 illustrates an exemplary user interface display for an application on an access device, according to embodiments of the present invention.

FIGS. 8-10 illustrate exemplary embodiments of screenshots of an exemplary user interface (UI) display for an application on an access device, according to embodiments of the present invention. However, the exemplary UIs are not limited to these example embodiments. In an embodiment of the invention, the visual interfaces illustrated in FIGS. 8-10 are displayed on a mobile computing device, which can have a touch sensitive (i.e., touch screen) display device. For ease of explanation, the monitoring and control operations discussed below with reference to FIGS. 8-10 are described in the context of an application executing on an access device 108 with a touch-screen display device. However, the operations are not intended to be limited to the exemplary device shown in FIGS. 8-10. It is to be understood that the user interfaces illustrated in the exemplary embodiments of FIGS. 8-10 can be readily adapted to be rendered on displays of a variety of computing device platforms running a variety of operating systems. Throughout FIGS. 8-10, displays are shown with various tiles, interactive elements, icons, command regions, windows, toolbars, menus, and buttons that are used to initiate action, invoke routines, monitor network devices, control network devices, or invoke other functionality. The initiated actions include, but are not limited to, displaying a state or status of a network device, selecting a network device to control and/or monitor, setting a primary function of a network device, setting a secondary function of a network device, and other inputs and gestures. For brevity, only the differences occurring within the figures are described below.

FIG. 8 illustrates an exemplary user interface display 800 for an application on an access device, according to embodiments of the present invention. FIG. 8 discloses a list of two exemplary network devices, including devices 804A and 804B (one of which may be similar to, for example, network device 502), which have displays 801A and 801B assigned to devices 804A and 804B respectively. Device 804A is connected to a hall switch 806A and device 804B that is connected to a motion sensor 806B. Device 804A can be turned on by a user by pressing button 808A and device 804B can be turned on by a user by pressing button 808B.

FIG. 9 illustrates another exemplary user interface display 900 for an application on an access device, according to embodiments of the present invention. As noted with respect to FIG. 7, an access device, such as access device 708, may communicate with gateway 110 (or, for example, with the network device or external cloud network 114 directly) and may confirm whether the network device should be authenticated/allowed to join the local area network. As another example, a device on the local area network, such as gateway 110, may communicate with access device 108 to confirm whether the network device should be allowed to join the local area network such that the network device is associated with the local area network. As such, access device 108 may present/display a query 910 ("Device Authorized?") to a user of access device 108 requesting an input regarding whether the user wants the network device to be connected to the local area network. The user may use the query switch to select "yes" or "no" to the query to indicate to the access device whether the newly recognized device should be associated with the local area network such that the device should be allowed to join the network. The user may also input login credentials, such as login credentials 912 including a username and password, that the network device may use to join the network. After the user inputs an answer to the query into the UI display of the access device, access device 108 may transmit a communication to gateway 110 indicating that the network device is or is not intended (e.g. by the user) to be connected to the local area network including the login credentials inputted by the user. Thereafter, after gateway 110 receives a communication from access device 108 that the network device is associated with the local area network, gateway 110 may transmit the login credentials to the network device and the network device may use the login credentials to pair with gateway 104 and continue the process of joining the network device with the local area network.

FIG. 10 illustrates another exemplary user interface display 1000 for an application on an access device, according to embodiments of the present invention. FIG. 10 discloses a list of exemplary network devices, including devices 804A and 804B, which have associated displays 801A and 801B respectively, as shown in FIG. 8. FIG. 10 also discloses a display 1001 associated with the new network device, network device 904 that is connected to lamp 906. Display 1001 (which shows network device 1004, connected to lamp 1006) may appear on UI display 1000 after network device 904 has joined the local area network (and therefore after a user enters an input to indicate to the access device that the newly recognized device is be associated with the local area network such that the device should be allowed to join the network). Similar to power button 808A for device 804A and power button 808B for device 804B, the display 1001 for new network device 904 includes power button 1008 for turning lamp 906 on and off.

The network device, e.g. network device 502, may fail to pair with gateway 104 and may fail to join the local area network due to incorrect/invalid login credentials. More specifically, if the login credentials provided to network device 502 (via gateway 110) by access device 108 are valid network credentials, network device 502 may pair with/connect to gateway 110 and join the local area network. However, if the login credentials provided to network device 502 (via gateway 110) by access device 108 are not valid network credentials, or if network device 502 is otherwise unable to connect to gateway 110, network device 502 may be denied access to the local area network. In such a situation, gateway 110 may recognize that network device 502 has not joined the local area network, and may communicate with access device 708 (and ultimately the user) to obtain new login/network credentials. More specifically, access device 708 may display a notification to the user that network device 502 failed to connect to the local area network, and request for the user to re-enter the appropriate credentials.

The exemplary user interface illustrates in FIGS. 8-10, and the access device that displays such user interfaces, may be used to communicate with the user regarding issues other than authentication. For example, a component of the source entity system (e.g. source entity cloud network), an external cloud network, or a device on the local area network, may communicate with access device 708 and the user to notify the user of progress throughout the connection process of a network device, such as network device 502. For example, the access device may display a notification to the user that a network device has been successfully (or unsuccessfully) joined on the network, that a network device has been pre-authorized to join the network such that the network device will be connected to the network upon booting up, or any other stage of the processes described herein. Furthermore, settings may be chosen such that a user is prompted/queried each time the system may pass sensitive/private information (e.g. information regarding an acquisition, user/acquirer, device, etc.) to a different device/network. On the other hand, settings may be chosen such that the user is not prompted/queried when such happenings occur. Settings may also be chosen such that the user may choose which steps of the process cause the user to be prompted/queried/notified.

Figure 11:
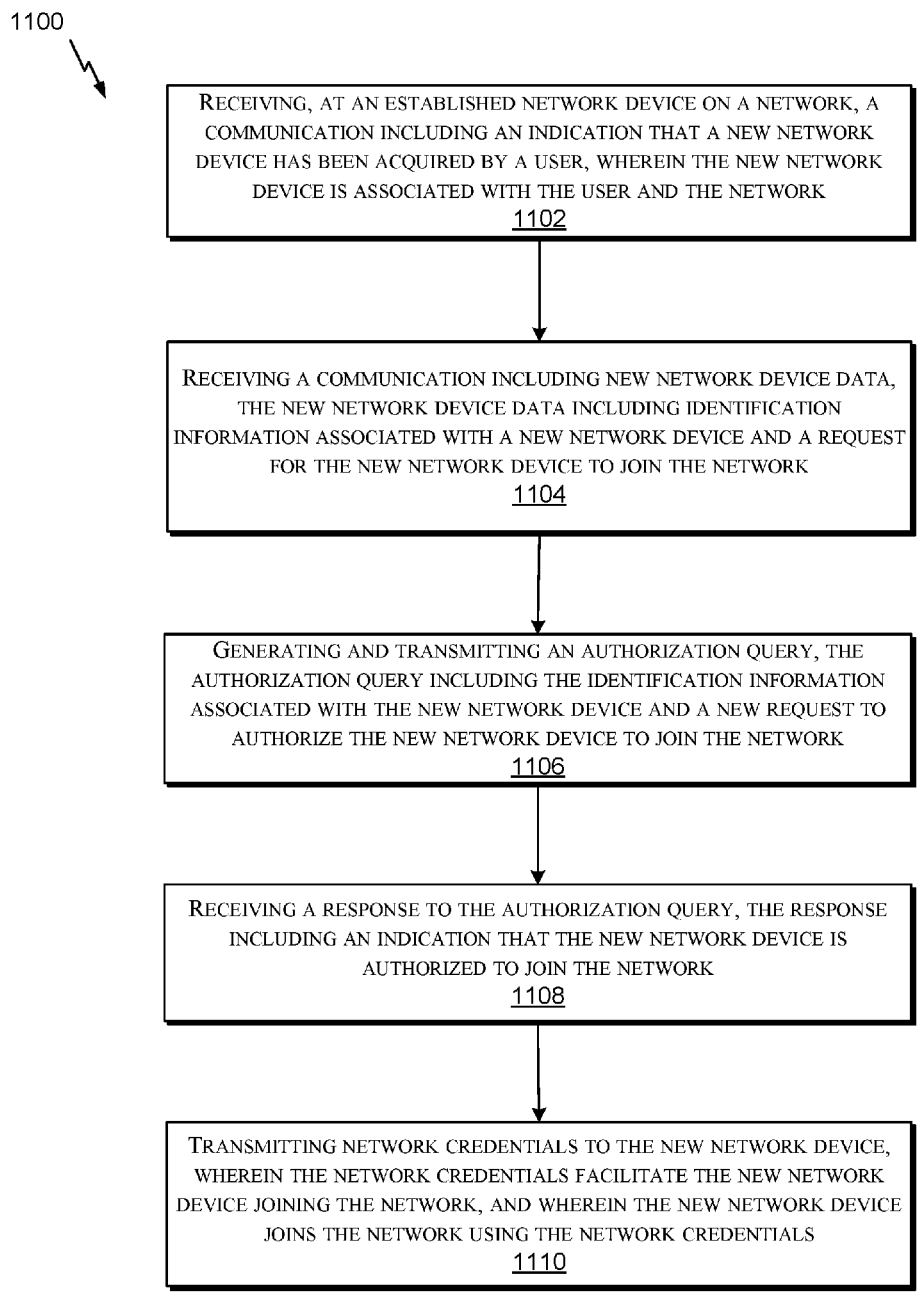
FIG. 11 illustrates a flow chart of an exemplary process for connecting an acquired device to a local area network, according to embodiments of the present invention.
Figure 12:
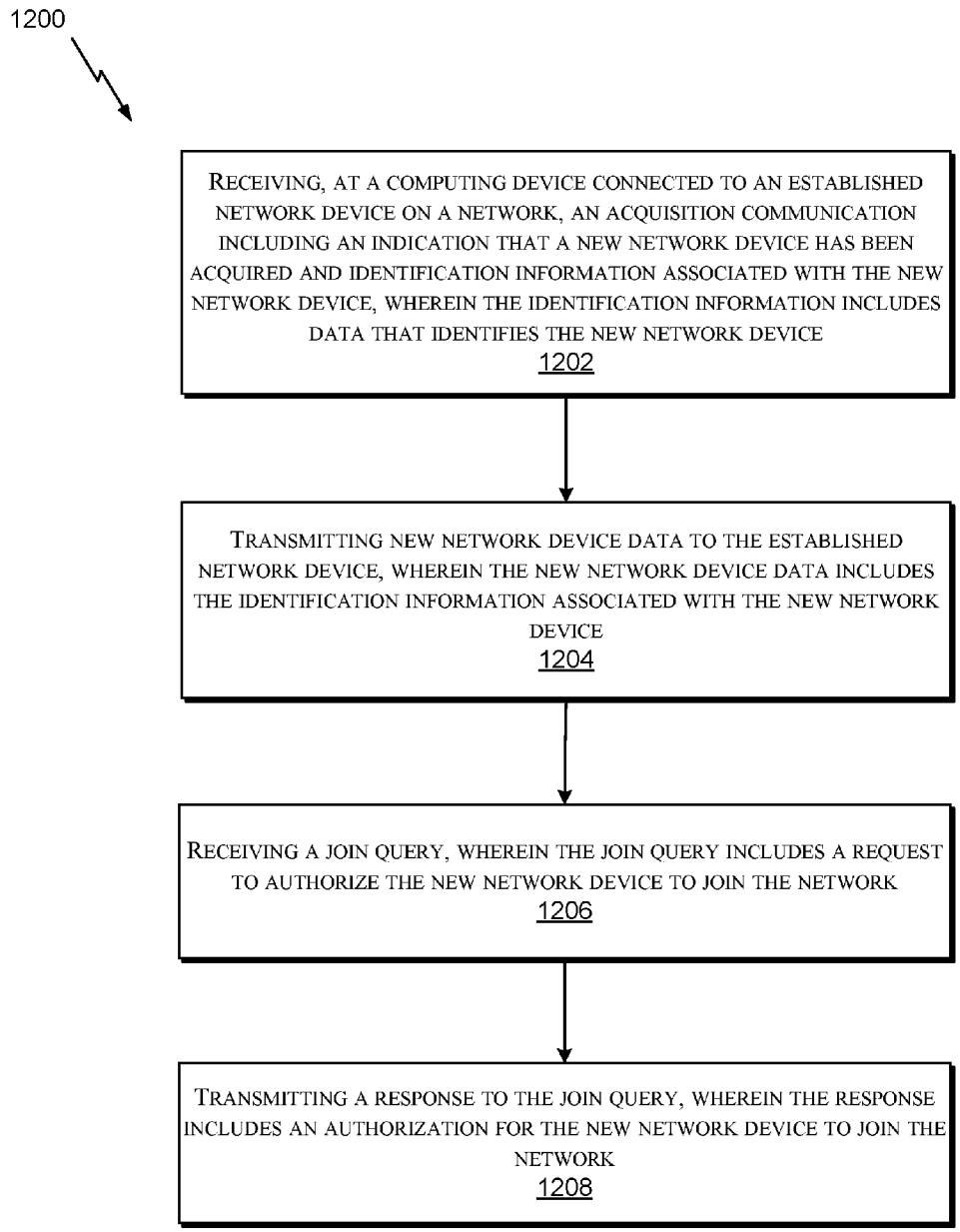
FIG. 12 illustrates a flow chart of an exemplary process for connecting an acquired device to a local area network, according to embodiments of the present invention.

FIG. 11 illustrates a flow chart of an exemplary process 1100 for connecting a acquired device to a local area network, according to embodiments of the present invention. Step 1102 includes receiving, at an established network device on a network, a communication including an indication that a new network device has been acquired by a user, wherein the new network device is associated with the user and the network. Step 1104 includes receiving a communication including new network device data, the new network device data including identification information associated with a new network device and a request for the new network device to join the network. Step 1106 includes generating and transmitting an authorization query, the authorization query including the identification information associated with the new network device and a new request to authorize the new network device to join the network. Step 1108 includes receiving a response to the authorization query, the response including an indication that the new network device is authorized to join the network. Step 1110 includes transmitting network credentials to the new network device, wherein the network credentials facilitate the new network device joining the network, and wherein the new network device joins the network using the network credentials FIG. 12 illustrates a flow chart of an exemplary process 1200 for connecting a acquired device to a local area network, according to embodiments of the present invention. Step 1202 includes receiving, at a computing device connected to an established network device on a network, an acquisition communication including an indication that a new network device has been acquired and identification information associated with the new network device, wherein the identification information includes data that identifies the new network device. Step 1204 includes transmitting, by the computing device, new network device data to the established network device, wherein the new network device data includes the identification information associated with the new network device. Step 1206 includes receiving, by the computing device, a join query, wherein the join query includes a request to authorize the new network device to join the network. Step 1208 includes transmitting, by the computing device, a response to the join query, wherein the response includes an authorization for the new network device to join the network.

The term "physical or virtual location" as used herein may be used interchangeably with or to mean the term "store" or "retail store" or "retailer" location as used by one of ordinary skill in the art. Furthermore, the term "source entity" or "network device source entity" as used herein may be used interchangeably with or to mean the term "retailer" (business) or "new network device retailer" as used by one of ordinary skill in the art. Furthermore, the term "source entity acquisition system", "acquisition system" or "source entity acquisition system" as used herein may be used interchangeably with or to mean the term "point of sale system", "POS system", "point of sale" or "POS" as used by one of ordinary skill in the art. Furthermore, the term "acquisition", "item acquisition" or "source entity acquisition" as used herein may be used interchangeably with or to mean the term "transaction" or "retail transaction". Furthermore, the term "user" or "acquirer" as used herein may be used interchangeably with or to mean the term "customer" (e.g. of the source entity) as used by one of ordinary skill in the art. Furthermore, the term "item", "object" or "service" as used herein may be used interchangeably with or to mean (or as examples of) the term "product", "merchandise", "inventory" or "stock" as used by one of ordinary skill in the art. Furthermore, the term "acquire" or "acquisition" as used herein may be used interchangeably with or to mean the term "purchase" or "buy" as used by one of ordinary skill in the art. Furthermore, the term "acquisition information" or "acquisition data" as used herein may be used interchangeably with or to mean the term "credit card payment information" or "credit card payment data" as used by one of ordinary skill in the art. Furthermore, the term "source entity frequent user program" or "frequent user program" as used herein may be used interchangeably with or to mean the term "rewards program" as used by one of ordinary skill in the art.

Figure 13:
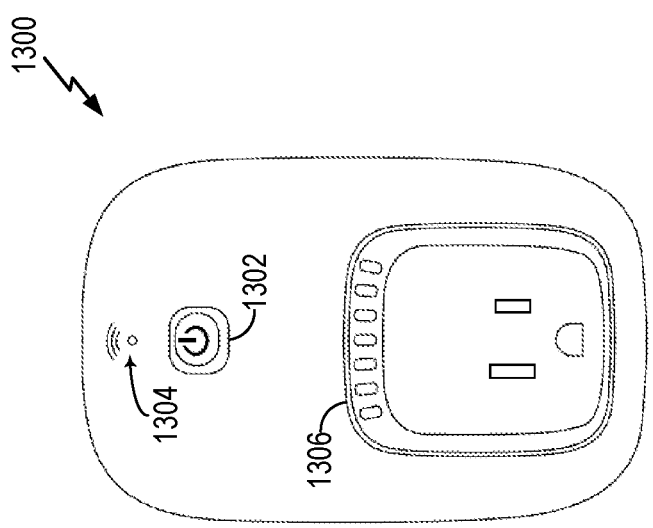
FIG. 13 is an illustration of an example of a front view of a network device, according to embodiments of the present invention.
Figure 14:
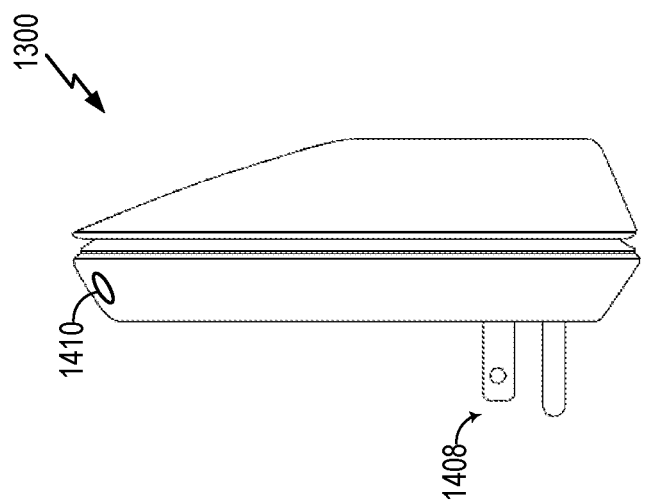
FIG. 14 is an illustration of an example of a side view of a network device, according to embodiments of the present invention.

FIG. 13 illustrates an example of a front view of a network device 1300 and FIG. 14 illustrates an example of a side view of the network device 1300. The network device may include any of the network devices described herein. In some embodiments, the network device 1300 may be a home automation network device. For example, the network device 1300 may include a home automation switch that may be coupled with a home appliance. A user may wirelessly access the network device 1300 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 1300 may include a WiFi enabled switch that connects home appliances and other electronic devices to a compatible 802.11b/g/n WiFi network. The network device 1300 may thus allow users to locally or remotely turn devices on or off from anywhere, program customized notifications, and/or change device status. The network device 1300 may further allow a user to create custom schedules or have devices respond to sunrise or sunset.

The network device 1300 includes a power switch 602 that may be depressed in order to turn the network device 1300 on and off. In some embodiments, a light source may be integrated with or located behind the power switch. For example, a light-emitting diode (LED) may be located on a circuit board under the power button 1302. The light source may be illuminated when the network device 1300 is powered on, and may not be illuminated when the network device 1300 is powered off.

The network device 1300 further includes a communications signal indicator 1304. The signal indicator 1304 may indicate whether the network device 1300 has access to a communications signal, such as a WiFi signal. For example, the signal indicator 604 may include a light source (e.g., a LED) that illuminates when the network device 1300 is connected to a communications signal. The light source may depict different colors or other characteristics (e.g., flashing, dimming, or the like) to indicate different levels of signal strength or mode of operation.

The network device 1300 includes a restore button 1410. The restore button 1410 may allow a user to reset the network device 1300 to factory default settings. For example, upon being depressed, the restore button 1410 may cause all software on the device to be reset to the settings that the network device 1300 included when acquired from the manufacturer.

The network device 1300 further includes a plug 1408 and an outlet 1306. The plug 1408 allows the network device 1300 to be plugged into a wall socket, such as a socket providing 120V, 220V, or the like. In turn, an appliance may be plugged into the outlet 1306. Once the network device 1300 is registered according to the techniques described above, an appliance plugged into the socket 1306 may be controlled by a user using an access device (e.g., access device 108).

Figure 15:
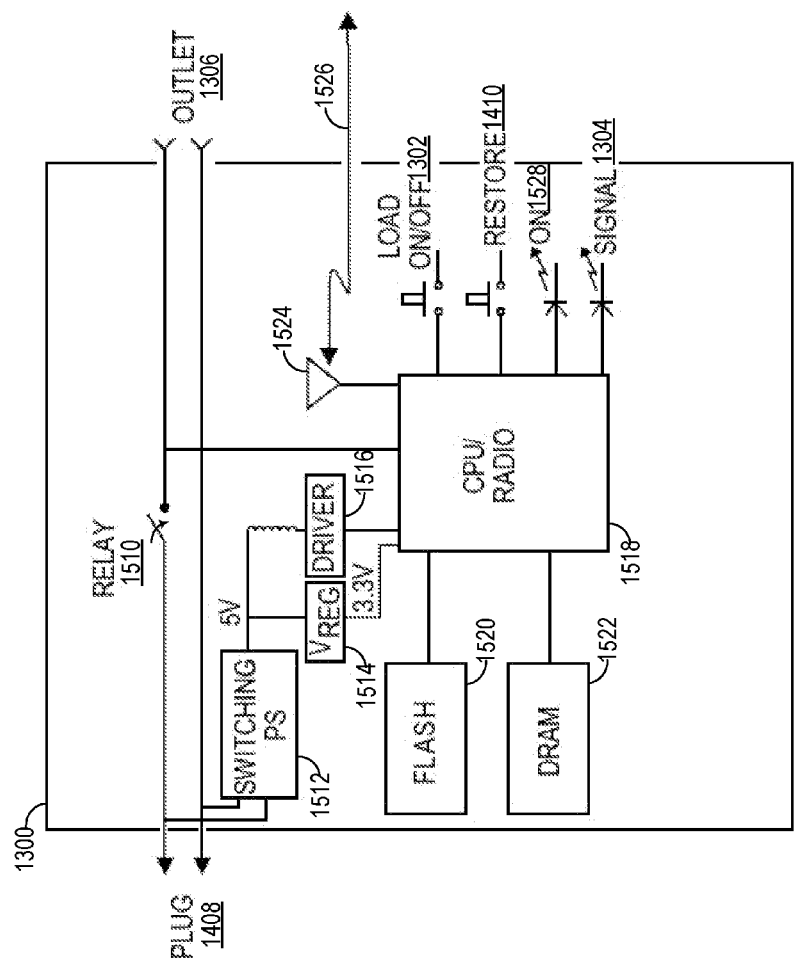
FIG. 15 is an example of a block diagram of a network device, according to embodiments of the present invention.

FIG. 15 is an example of a block diagram of the network device 1300 depicting different hardware and/or software components of the network device 1300. As described above with respect to FIG. 13, the network device 1300 includes the outlet 1306, the plug 1408, the power button 1302, the restore button 1410, and the communications signal indicator 1304. The network device 1300 also includes light source 1528 associated with the power button 1302. As previously described, the light source 1528 may be illuminated when the network device 1300 is powered on.

The network device 1300 further includes a relay 1510. The relay 1510 is a switch that controls whether power is relayed from the plug 1408 to the outlet 1306. The relay 1510 may be controlled either manually using the power button 1302 or remotes using wireless communication signals. For example, when the power button 1302 is in an ON position, the relay 1510 may be closed so that power is relayed from the plug 1408 to the outlet 1306. When the power button 1302 is in an OFF position, the relay 1510 may be opened so that current is unable to flow from the plug 1408 to the outlet 1306. As another example, an application or program running on an access device may transmit a signal that causes the relay 1510 to be opened or closed. For instance, a mobile application may display a graphical interface on the access device that includes a power button. The user may tap or otherwise select the power button, and the mobile application may send a communication signal (e.g., over a WiFi network) to the network device 1300 instructing the network device 1300 to open or close the relay 1510.

The network device 1300 further includes flash memory 1520 and dynamic random access memory (DRAM) 1522. The flash memory 1520 may be used to store instructions or code relating to an operating system, one or more applications, and any firmware. The flash memory 1520 may include nonvolatile memory so that any firmware or other program can be can updated. In the event the network device 1300 loses power, information stored in the flash memory 1520 may be retained. The DRAM 1522 may store various other types of information needed to run the network device 1300, such as all runtime instructions or code.

The network device 1300 further includes a CPU/Radio 1518. The CPU/Radio 1518 controls the operations of the network device 1300. For example, the CPU/Radio 1518 may execute various applications or programs stored in the flash memory 1520 and/or the dynamic random access memory (DRAM) 1522. The CPU/Radio 1518 may also receive input from the various hardware and software components, interpret the input, and perform one or more functions in response to the input. As one example, the CPU/Radio 1518 may determine whether the power button 1302 has been pressed, and determines whether the relay 1510 needs to be opened or closed. The CPU/Radio 1518 may further perform all communications functions in order to allow the network device 1300 to communicate with other network devices, one or more gateways, a cloud network, and/or one or more access devices. While the CPU and radio of the network device 1300 are shown to be combined in the CPU/Radio 1518, one of ordinary skill in the art will appreciate that, in some embodiments, the CPU and radio may be separately located within the network device 1300. For example, CPU circuitry may be situated at a separate location on a circuit board from the location of radio circuitry, the CPU circuitry may be located on a different circuit board from the radio circuitry, or the like.

The network device 1300 may communicate with other devices and/or networks via antenna 1524. For example, antenna 1524 may include a 2.4 GHz antenna that can transmit and receive WiFi communications signals. The antenna 1524 may include other types of antennas that can communicate Bluetooth® signals, Zigbee® signals, Ultra-Wideband (UWB) signals, and/or the like. In some embodiments, the network device 1300 may include multiple antennas for communicating different types of communication signals.

The network device 1300 further includes a driver 1516, a switching power supply 1512, and a voltage regulator 1514. The driver 1516 may include instructions or code that can be used to translate control signals or commands received from applications running on the DRAM 1522 to commands that the various hardware components in the network device 1300 can understand. In some embodiments, the driver 1516 may include an ambient application running on the DRAM 1522. The switching power supply 1512 may be used to transfer power from the outlet in which the plug 1408 is connected to the various loads of the network device 1300 (e.g., CPU/Radio 718). The switching power supply 1512 may efficiently convert the voltage and current characteristics of the electrical power to a level that is appropriate for the components of the network device 1300. For example, the switching power supply 1512 may perform AC-DC conversion. In some embodiments, the switching power supply 1512 may be used to control the power that is relayed from the plug 1408 to the outlet 1306. The voltage regulator 1514 may be used to convert the voltage output from the switching power supply 1512 to a lower voltage usable by the CPU/Radio 1518. For example, the voltage regulator 1514 may regulate the DC voltage from 5V to 3.3V.

In various embodiments, functions may be stored as one or more instructions or code in memory, such as the flash memory 1520 and/or the DRAM 722. The network device 1300 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory, such as the flash memory 1520 and/or the DRAM 1522, may be a processor-readable memory and/or a computer-readable memory that stores software code (programming code, instructions, etc.) configured to cause a processor(s) within the CPU/Radio 1518 to perform the functions described. In other embodiments, one or more of the functions described may be performed in hardware.

A set of these instructions and/or code might be stored on a computer-readable storage medium, such as the flash memory 1520 and/or the DRAM 1522. In some cases, the storage medium might be incorporated within a computer system, such as the CPU/Radio 1518. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 1300 and/or might take the form of source and/or installable code, which, upon compilation and/or installation on the network device 1300 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other mobile or computing devices such as network input/output devices may be employed.

It should be appreciated that the network device 1300 may have other components than those depicted in FIG. 13. Further, the embodiment shown in the figures are only one example of a network device that may incorporate an embodiment of the invention. In some other embodiments, network device 1300 may have more or fewer components than shown in the figure, may combine two or more components, or may have a different configuration or arrangement of components.

Figure 16:
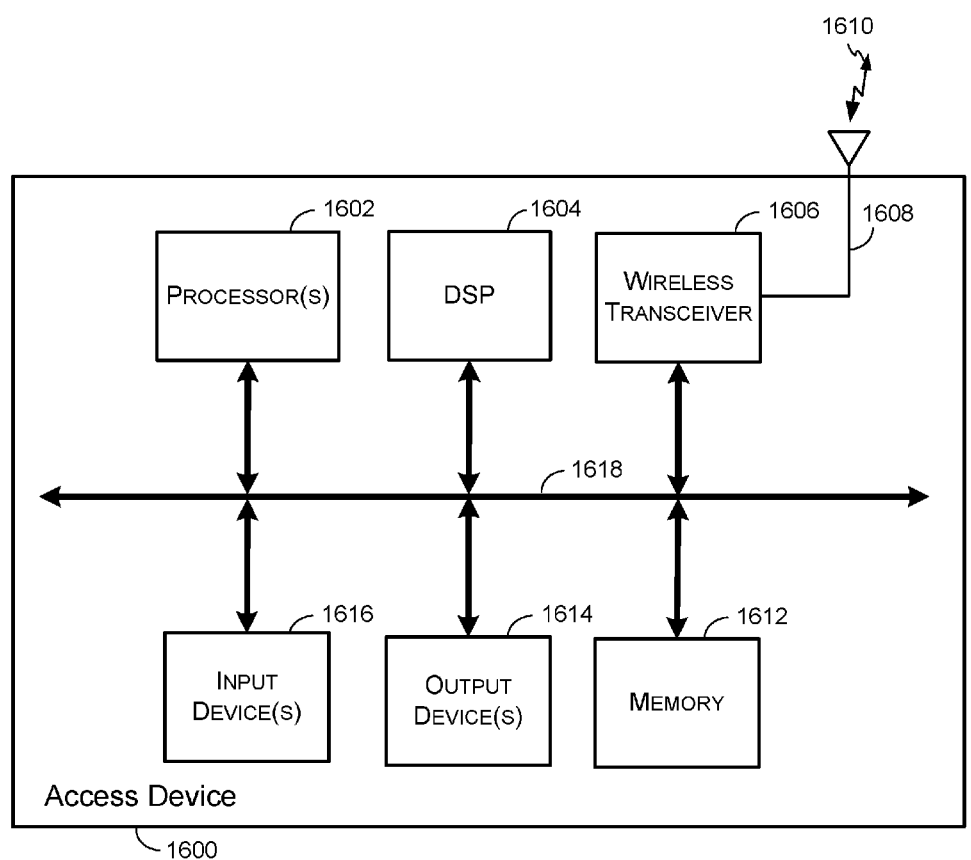
FIG. 16 is a block diagram illustrating an example of an access device, according to embodiments of the present invention.

FIG. 16 illustrates an example of an access device 1600. The access device 1600 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 1600 includes hardware elements that can be electrically coupled via a bus 1618 (or may otherwise be in communication, as appropriate). In one embodiment, the bus 1618 can be used for the processor(s) 1602 to communicate between cores and/or with the memory 1612. The hardware elements may include one or more processors 1602, including without limitation one or more general-purpose processors and/or one or more special-purpose processors (such as digital signal processing chips, graphics acceleration processors, and/or the like); one or more input devices 1616, which can include without limitation a camera, a mouse, a keyboard, a touch sensitive screen, a touch pad, a keypad, and/or the like; and one or more output devices 1614, which can include, without limitation, a display, a printer, and/or the like.

The access device 1600 may include one or more wireless transceivers 1606 connected to the bus 1618. The wireless transceiver 1606 may be operable to receive a wireless signal 1610 via antenna 1608. The wireless signal 1610 may be transmitted via a wireless network. In some embodiments, the wireless network may be any wireless network such as a wireless local area network (e.g., local area network 100), such as WiFi, a Personal Access Network (PAN), such as Bluetooth® or Zigbee®, or a cellular network (e.g. a GSM, WCDMA, LTE, CDMA2000 network). Wireless transceiver 1606 may be configured to receive various radio frequency (RF) signals 1610 via antenna 1608 from one or more gateways, network devices, cloud networks, and/or the like. Access device 1600 may also be configured to decode and/or decrypt, via the DSP 804 and/or processor(s) 1602, various signals received from one or more gateways, network devices, cloud networks, and/or the like.

The access device 1600 may further include (and/or be in communication with) one or more non-transitory storage devices (e.g., memory 1612), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more instructions or code in memory 1612, such as on a computer-readable storage medium, such as RAM, ROM, FLASH, or disc drive, and executed by processor(s) 1602 or DSP 1604. The access device 1600 can also comprise software elements (e.g., located within the memory 1612), including, for example, an operating system, device drivers, executable libraries, and/or other code, such as one or more application programs, which may comprise computer programs implementing various functions Memory 1612 may be a processor-readable memory and/or a computer-readable memory that stores software code (programming code, instructions, etc.) configured to cause the processor(s) 1602 and/or DSP 1604 to perform the various functions. In other embodiments, the various functions described may be performed in hardware.

Figure 17:
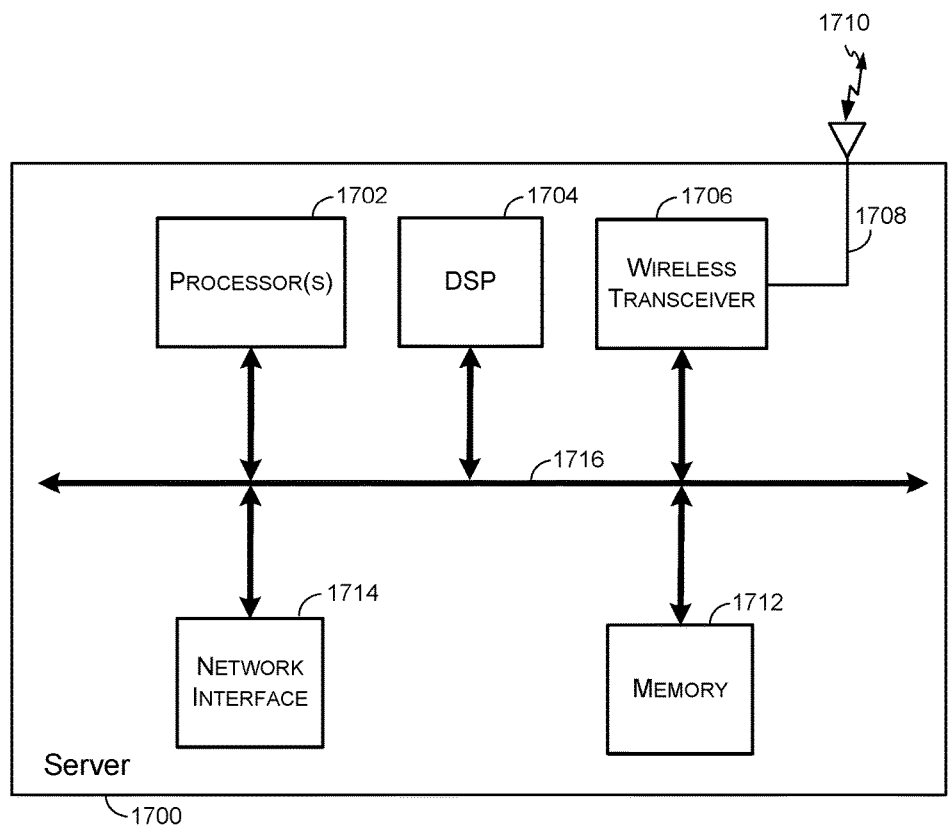
FIG. 17 is a block diagram illustrating an example of a server, according to embodiments of the present invention.

FIG. 17 illustrates an example of a server 1700. The server 1700 includes hardware elements that can be electrically coupled via a bus 1716 (or may otherwise be in communication, as appropriate). In one embodiment, the bus 1716 can be used for the processor(s) 1702 to communicate between cores and/or with the memory 1712. The hardware elements may include one or more processors 1702, including without limitation one or more general-purpose processors and/or one or more special-purpose processors (such as digital signal processing chips, graphics acceleration processors, and/or the like), memory 1712, DSP 1704, a wireless transceiver 1706, a bus 1716, and antenna 1708. Furthermore, in addition to the wireless transceiver 1706, server 1700 can further include a network interface 1714 to communicate with a network (e.g., a local area network, a network of a preferred carrier, Internet, etc.).

The server 1700 may further include (and/or be in communication with) one or more non-transitory storage devices (e.g., memory 1712), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more instructions or code in memory 1712. The server 1700 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. The memory 1712 may be a processor-readable memory and/or a computer-readable memory that stores software code (programming code, instructions, etc.) configured to cause the processor(s) 1702 to perform the functions described. In other embodiments, one or more of the functions described may be performed in hardware.

A set of these instructions and/or code might be stored on a computer-readable storage medium, such as the memory 1712. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the server 1700 and/or might take the form of source and/or installable code, which, upon compilation and/or installation on the server 1700 (e.g., using any of a variety of generally available compilers, installation programs, compression/decompression utilities, etc.) then takes the form of executable code.

Figure 18:
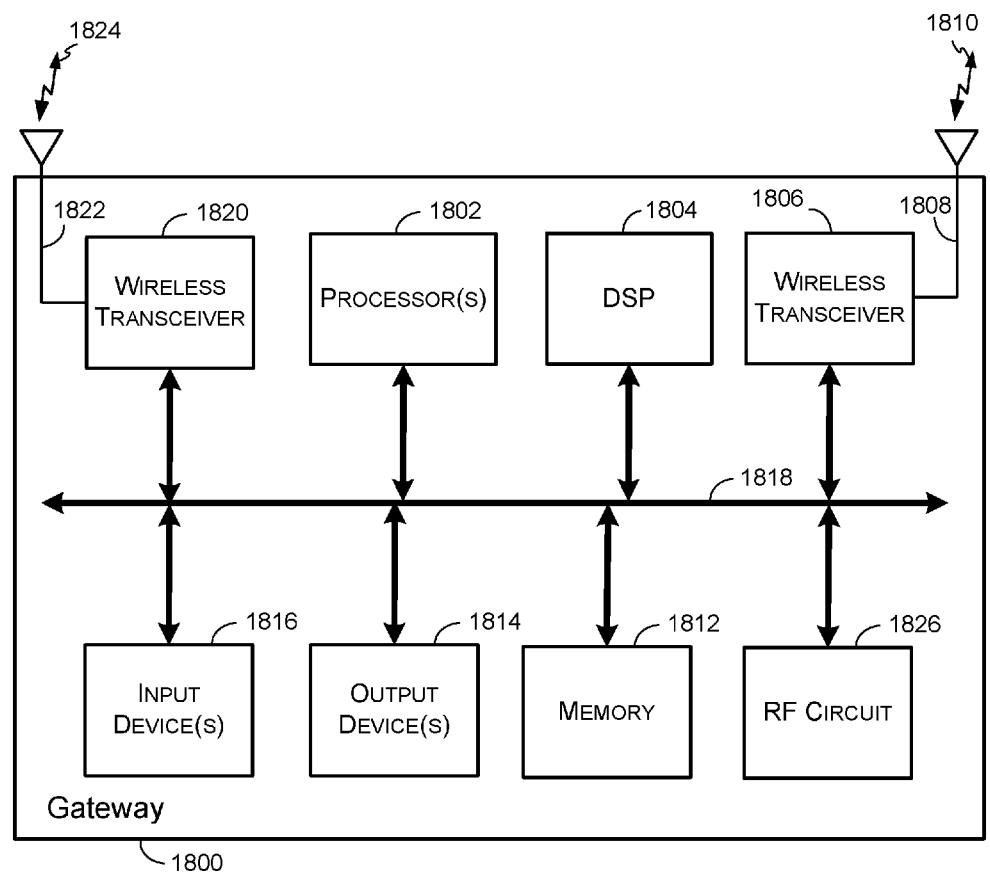
FIG. 18 is a block diagram illustrating an example of a gateway, according to embodiments of the present invention.

FIG. 18 illustrates an example of a gateway 1800. The gateway 1800 may include a range extending device, a router, an access point, a modem, and/or any other device that provides network access among one or more computing devices and/or external networks. For example, the gateway 1800 may include a router gateway with access point and router functionality, and may further include an Ethernet switch and/or a modem. As another example, the gateway 1800 may include a range extending gateway that may be used to improve signal range and strength within a network by taking an existing signal from another gateway (e.g., a router gateway, an access point, or the like) and rebroadcasting the signal to create a second logical network.

The gateway 1800 includes hardware elements that can be electrically coupled via a bus 1818 (or may otherwise be in communication, as appropriate). In one embodiment, the bus 1818 can be used for the processor(s) 1802 to communicate between cores and/or with the memory 1812. The hardware elements may include one or more processors 1802, including without limitation one or more general-purpose processors and/or one or more special-purpose processors (such as digital signal processing chips, graphics acceleration processors, and/or the like); one or more input devices 1816, which can include without limitation one or more buttons, a keyboard, a keypad, a touch sensitive screen, a touch pad, and/or the like; and one or more output devices 1814, which can include, without limitation, a display, light or sound indicators, and/or the like.

The gateway 1800 may include one or more wireless transceivers 1806 and 1820 connected to the bus 1818. The wireless transceiver 1806 may be operable to receive wireless signals (e.g., a wireless signal 1810) via an antenna 1808. The wireless transceivers 1820 may be operable to receive wireless signals (e.g., a wireless signal 1814) via an antenna 1822. The wireless transceivers 1806 and 1820 may each include a WiFi transceiver radio designed to transmit and receive signals using frequencies of a specific frequency band, which may be referred to herein as "WiFi circuits." For example, wireless transceiver 1806 may include a 2.4 GHz WiFi circuit, and wireless transceiver 1820 may include a 5 GHz WiFi circuit. Accordingly, the gateway 1800 may include a single WiFi circuit for a first WiFi frequency band, and a single WiFi circuit for a second WiFi frequency band. In some embodiments, the gateway 1800 may include multiple wireless transceivers (not shown) for each available frequency band. The antennas 1808 and 1822 may include multiple band antennas that can transmit and/or receive signals over different frequency bands.

The gateway 1800 may further include radio frequency (RF) circuit 1826. In some embodiments, the wireless transceivers 1806 and 1820 may be integrated with or coupled to the RF circuit 1826 so that the RF circuit 1826 includes the wireless transceivers 1806 and 1820. In some embodiments, the wireless transceivers 1806 and 1820 and the RF circuit 1826 are separate components. The RF circuit 1826 may include a RF amplifier that may amplify signals received over antennas 1808 and 1822. The RF circuit 1826 may also include a power controller that may be used to adjust signal amplification by the RF amplifier. The power controller may be implemented using hardware, firmware, software, or any combination thereof.

The wireless signals 1810 and 1824 may be transmitted via a wireless network. In some embodiments, the wireless network may be any wireless network such as a wireless local area network (e.g., local area network 100), such as WiFi™, a Personal Access Network (PAN), such as Bluetooth® or Zigbee®, or a cellular network (e.g. a GSM, WCDMA, LTE, CDMA2000 network). Wireless transceivers 1806 and 1820 may be configured to receive various radio frequency (RF) signals (e.g., signals 1810 and 1824) via antennas 1808 and 1824, respectively, from one or more other gateways, access devices, network devices, cloud networks, and/or the like. Gateway 1800 may also be configured to decode and/or decrypt, via the DSP 1804 and/or processor(s) 1802, various signals received from one or more gateways, network devices, cloud networks, and/or the like.

The gateway 1800 may include a power supply (not shown) that can power the various components of the gateway 1800. The power supply may include a switch-mode power supply, a linear power supply, a push-pull power supply, or any other suitable type of power supply. In some embodiments, the gateway 1800 may include multiple power supplies. For example, a switch-mode power supply may be used to condition input power, and a linear power supply may be used to power the RF circuit 1826. The power supply may be configured to operate over various ranges of appropriate input voltages.

The gateway 1800 may further include (and/or be in communication with) one or more non-transitory machine-readable storage mediums or storage devices (e.g., memory 1812), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1812, such as RAM, ROM, FLASH, or disc drive, and executed by processor(s) 1802 or DSP 1804. The gateway 1800 can also comprise software elements (e.g., located within the memory 1812), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to, for example, FIGS. 11 and/or 12, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to, for example, FIGS. 11 and/or 12. The memory 1812 may be a non-transitory machine-readable storage medium, processor-readable memory, and/or a computer-readable memory that stores the one or more computer-program products configured to cause the processor(s) 1802 to perform the functions described. In other embodiments, one or more of the functions described may be performed in hardware.

A set of these instructions and/or code might be stored on a non-transitory machine-readable storage medium, such as the memory 1812. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the gateway 1800 and/or might take the form of source and/or installable code, which, upon compilation and/or installation on the gateway 1800 (e.g., using any of a variety of generally available compilers, installation programs, compression/decompression utilities, etc.) then takes the form of executable code.

Figure 19:
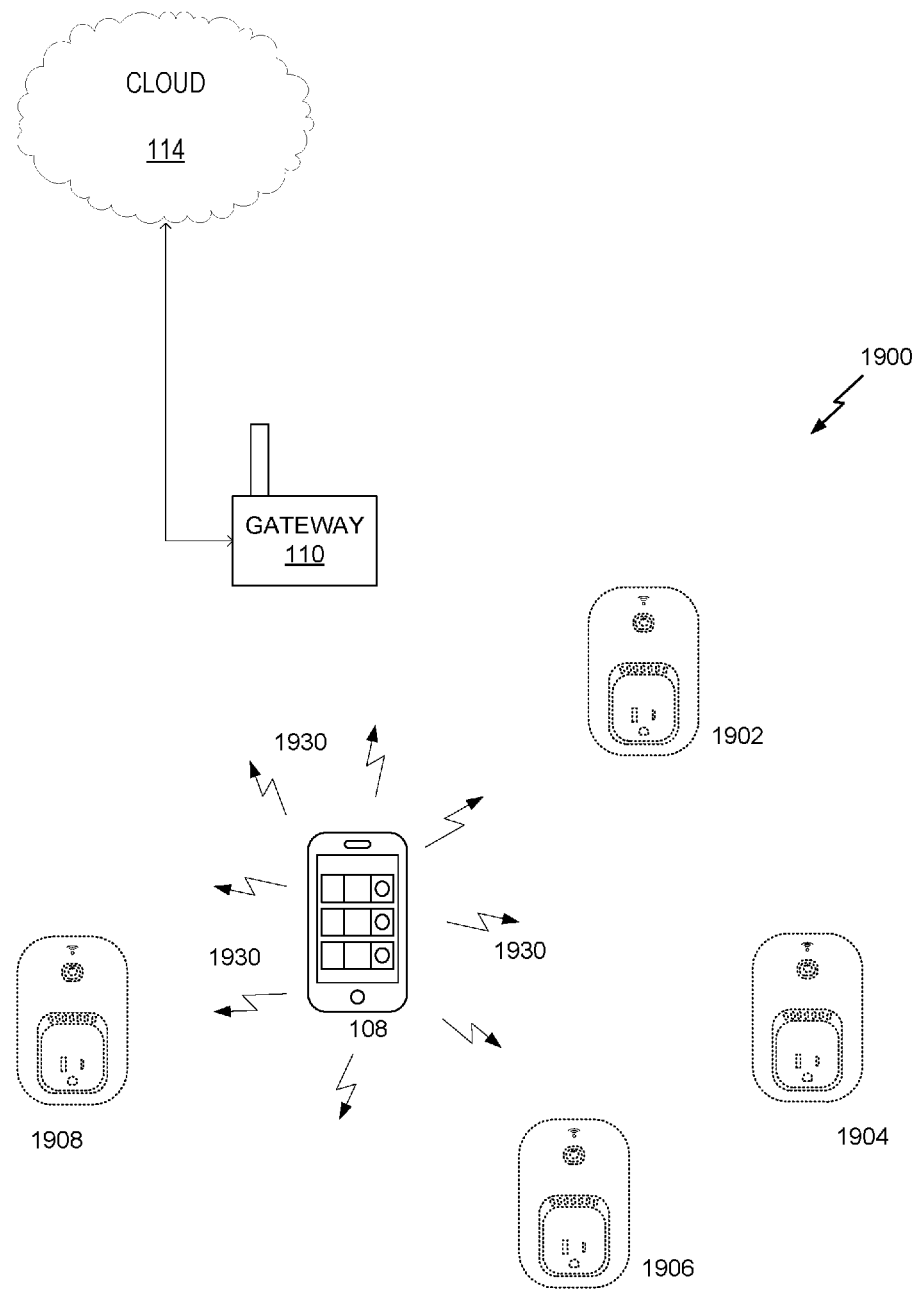
FIG. 19 illustrates an example of a network environment, according to embodiments of the present invention.

FIG. 19 illustrates an example of a network 1900, according to embodiments of the present invention. Specifically, the network 1900 can be a wireless local area network enabling an access device to communicate with network devices to control adjustment of attributes related to operation of the network devices. Network 1900 includes network device 1902, network device 1904, network device 1906, and network device 1908. The network 1900 also includes access device 108. In other words, the network 1900 may be substantially similar to the network 100 except that access device 108 has been turned on near the network 1900, to which it is associated, or has entered an area to which the network 1900 can reach.

When access device 108 can enter the network 1900 as shown in FIG. 19, access device 108 may be authenticated based on the access device's authentication with the logical network or may otherwise commence communication with cloud network 114. Access device 108 may also communicate notification of its presence or other information directly to other network devices 1902-1908 within network 1900, as shown in FIG. 19 by communication paths 1930. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 1900, including network device 1902, network device 1904, network device 1906, and network device 1908, information/data regarding its status. Such status data may include the fact that it is present and turned on, or other status data/information. At any time that network devices 1902, 1904, 1906 and 1908 recognize that access device 108 is present at network 1900, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 1902-1908 and access device 108 may each receive communication from other network devices around the network 1900, including the status of each of those network devices, network devices 1902-1908 and/or access device 108 may be continuously scanning network 1900 (including, for example, running discovery algorithms) to determine whether any devices within the network have moved, turned on/off or otherwise added to or subtracted from the network 1900, or have otherwise changed statuses.

Since network devices 1902-1908 and access device 108 may each receive communication from other devices around network 1900, including the status of each of those devices, each network device within network 1900 may know the status of each other network device in the network 1900. For example, access device 108 or devices 1902-1908 may not be required to communicate with cloud network 114 in order to obtain one or more of such statuses. Since cloud network 114 is an external network and may be remote from network 1900, communication between network devices within the network 1900 and cloud 114 may take more time than communication between two devices within network 1900. For example, communication between devices within network 1900 may take anywhere from 1 millisecond to 100 milliseconds, while communication between a device within network 1900 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 1900 may choose to send and receive/retrieve statuses directly with other devices within the network 1900 instead of communicating such information via cloud network 114. When a network device receives status data from another network device on the device's local area network 1900, it may store that status data so that it may retrieve and use that status data at a later time.

Figure 20:
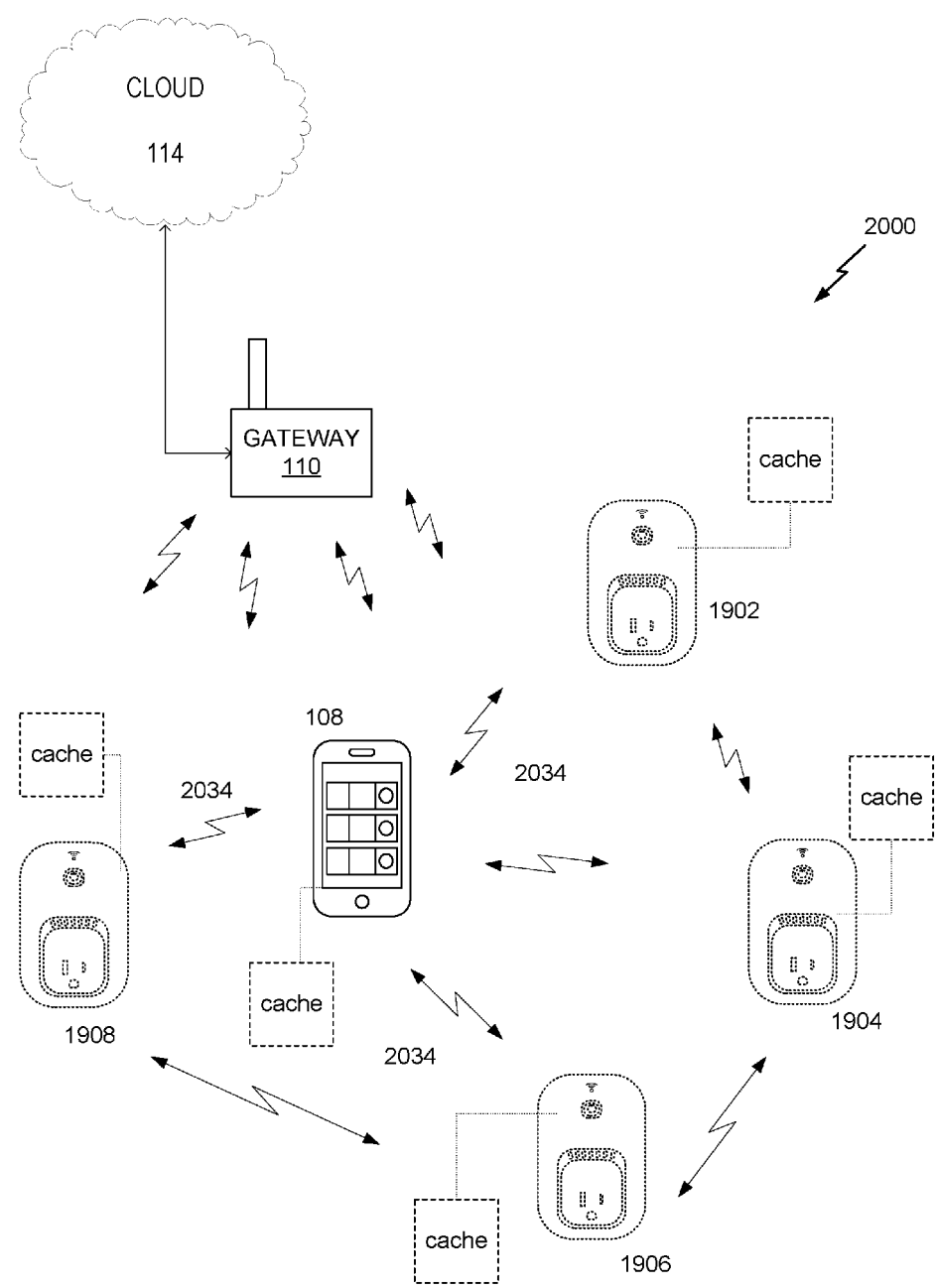
FIG. 20 illustrates an example of a network environment, according to embodiments of the present invention.
Figure 21:
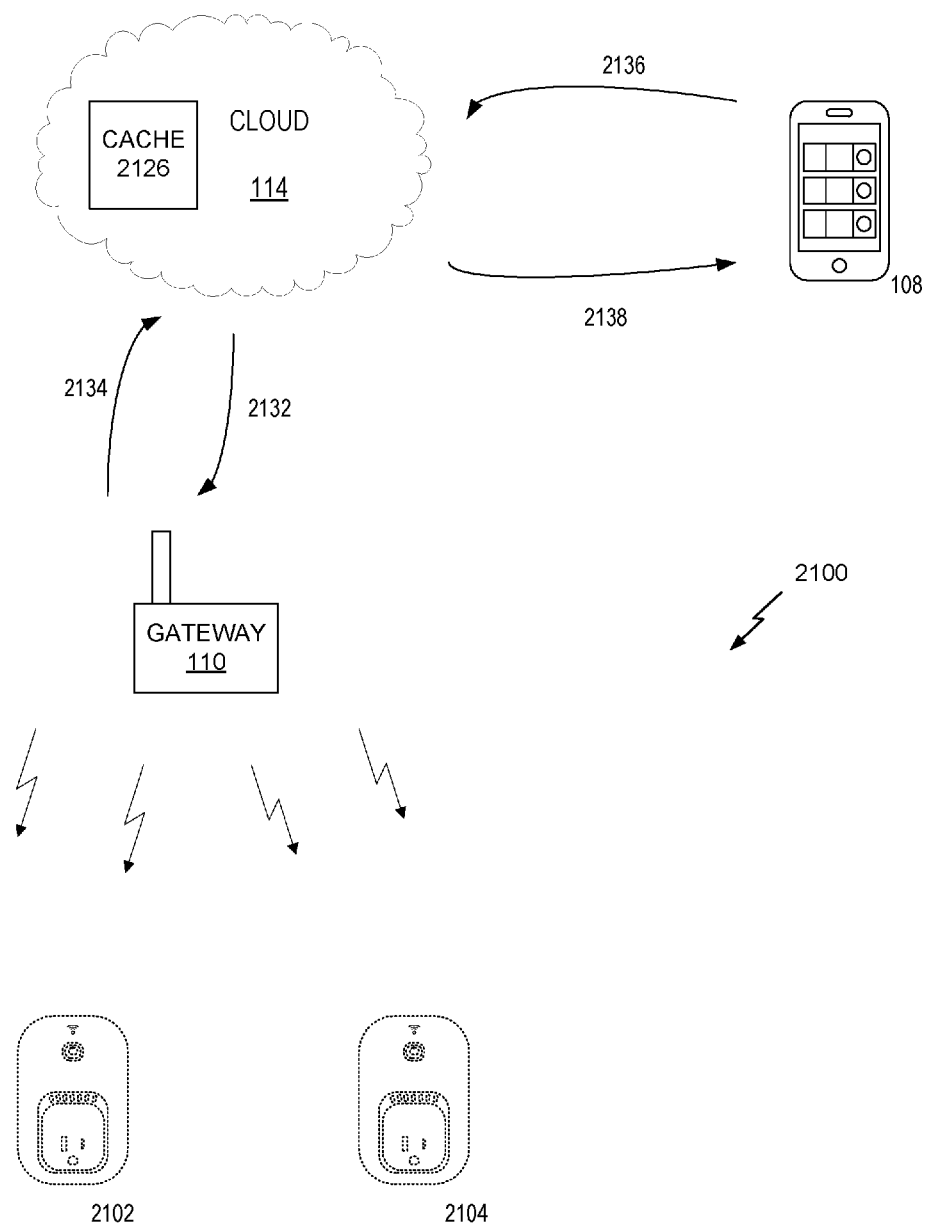
FIG. 21 illustrates an example of a network environment, according to embodiments of the present invention.

FIG. 20 illustrates an example of a network 2000, according to embodiments of the present invention. The local area network 2000 may include network device 1902, network device 1904, network device 1906, network device 1908, and access device 108. FIG. 20 also illustrates that one or more network devices 1902-1908 and/or access device 108 may include a storage device, such as a cache, for storing data, including data regarding its own status and data regarding statuses received from the other devices within local area network 2000. For example, access device 108 may, after being powered up, broadcast/send its status to network device 1908 via communication 2034. Network device 1908 may store the status data received from access device 108 until the next time access device 108 updates its status by sending new/updated status data to network device 1908. Cache may be used for storage within network devices 1902-1908 and/or access devices within the local area network 2000 so that each of the devices may be able to quickly retrieve the data it needs from storage. An application operating on the access device 108 can access the cache to obtain information to display the visual interface for each network device 1902-1908 registered within the network 2000. Although a caching device may be used to store such data within the network and/or access devices within the local area network 2000, other types of storage may be used.

The cache can contain a known interface list including interface information for different, known types of devices. The known list can include a record for each network device known by the access device 108 to exist on the network 2000. When an application is run on the access device 108, the access device 108 can access the known interfaces in the cache to present the display of access device 108. The display can present one or more visual interfaces, each corresponding to a network device known to exist on the network 2000. Each visual interface can be generated based on a visual interface module corresponding to each device on the network 2000. In an example, the display can include a visual interface (e.g., a module tile) for each device in the network 2000 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 2000. For example, the status display can include a speed of a fan (e.g., a fan speed of 56 in a range of values between 0 and 100) of the network device 1902 (e.g., a fan), a value of sensitivity of a sensor (e.g., a value of 34 in a range of values 0-100) for the network device 1904 (e.g., a motion sensor), a value of brightness (e.g., 65 percent brightness) for the network device 1906 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 2000 and can use that information to update its own cache, update the status display, and/or pass the information to the cloud network 114 and/or the gateway 110 for trouble shooting and/or storage.

Even though each network device may know and store (e.g. in cache) the state of each other network device within local area network 2000, a network device may not know when another network device changes status (e.g. turns/powers off). However, network devices and/or access devices within local area network 2000 may broadcast/send any updates in its status to other devices on the network. For example, if network device 1902 changes status, it may send status data to the other network devices, such as network devices 1904, 1906 and 1908 and to access device 108. However, network device 1902 may not know which devices to update since the other devices may change statuses periodically (e.g. turn off).

Therefore, a network or access device may subscribe to another network or access device within local area network 2000. For example, network devices 1904, 1906 and 1908 and access device 108 may subscribe to status data notifications/updates from network device 1902. Such a subscription may be registered for upon initial connection with network device 1902 when network device 1902 first enters local area network 2000 or at any other time after network device 1902 has been associated with local area network 2000. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 1902 may store a list of network devices 1904, 1906 and 1908 and access device 108 after those devices subscribe to network device 1902. Then, when network device 1902 undergoes a change in status, network device 1902 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 2000, each contain continuously updated statuses of each other device on the network and obtain those statuses and updates through direct communication without necessary use of the cloud.

FIG. 19 illustrates an access device 108 that is located remotely from network 1900 (e.g. local area network), according to embodiments of the present invention. Local area network 1900 includes gateway 110 and network devices 1902 and 1904 (which may be, for example, the same as any of network devices 1902-1908 in FIGS. 19 and 20), as shown in FIG. 19. However, network 1900 may also include a variety of other network devices and one or more access devices directly connected to network 1900. Gateway 110 is connected to cloud network 114, and allows network devices 1902 and 1904 to connect to cloud 114, the internet, or other external networks via gateway 110. In some embodiments, the network devices 1902 and 1904 may include home automation devices that allow a user to access, control, and/or configure various home appliances located within the user's home, such as a television, radio, light, microwave, iron, and/or the like.

Access device 108 is not directly connected to network 1900. Instead, access device 108 is external to network 1900 and may connect to cloud network 114 and to network 1900 via cloud network 114. As noted, network devices 1902 and 1904 may change status on a periodic basis. In some embodiments, even when external to and not directly connected to network 1900, an access device may request to check the status of the devices on the network. When access device 108 seeks to check the status of any device on the network, the access device 108 may transmit/send a communication 1936 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 1938 of such status data to the access device 108. For example, after network devices 1902 and 1904 are turned on, authenticated and are a part of network 1900, network devices 1902 and 1904 may communicate their statuses to cloud network 114. Furthermore, any time the status of network devices 1902 and 1904 changes, the device that incurred a status change may push/send information (e.g. an indication) of that status change to cloud network 114. Cloud network 114 may store, in cache 1926 or otherwise, the statuses (which may be time stamped in metadata or otherwise) of network devices 1902 and 1904. Therefore, when access device 108 requests from cloud network 114 the statuses of devices on network 1900, cloud 114 may send its most recently stored/updated statuses to access device 108.

To obtain the most updated status data of devices within network 1900, cloud 114 may, upon receiving a request for status data related to network devices 1902 and 1904, transmit/send a communication 1932 (e.g. request, query, etc.) for such status data to network devices 1902 and 1904 via gateway 110. Once network devices 1902 and 1904 receive this request, network devices 1902 and 1904 may send a communication 1934 (e.g. updated status data) to cloud 114 to replace the previously stored/cached statuses in cache 1926. Upon receipt of updated status data 1934 from network 1900, cloud 114 may send a communication 1938 of such status data to the access device 108.

However, the process of cloud network 114 requesting updated statuses from network devices 1902 and 1904 within network 1900 may cause latency within the system. More specifically, the time required for cloud network 114 to request updated statuses from network devices 1902 and 1904 and to in turn receive updated statuses from network devices 1902 and 1904 may be substantially greater than the time required for cloud network 114 to send its currently stored statuses (without being updated) for network devices 1902 and 1904 to access device 108. For example, of the total time required for access device 108 to receive updated statuses from cloud network 114, 80% or more of that total time may include cloud network 114 requesting updated statuses from network devices 1902 and 1904. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 1902 and 1904 is the transmission of data between cloud 114 and network devices 1902 and 1904, the access device 108 and cloud network 114 may maximize efficiency by minimizing the effect of the transmission of data between cloud 114 and network devices 1902 and 1904 on the whole process/system.

Techniques and systems are described herein for grouping associated network devices for control of the network devices. Certain network devices, and devices that may be connected to a network via the network devices, may be controlled remotely by, for example, an access device. To control multiple network devices at the same time, such multiple devices may be grouped together such that they are treated within the network as a single virtual device. Multiple devices may be grouped together in different ways. For example, a user of an access device controlling the network devices may choose which devices are grouped together. Furthermore, the access device and/or other devices on the network may automatically determine which devices should be grouped together. If network device groups are determined by an access or other device, the user may be presented with a suggested grouping for acceptance, rejection or editing. Network devices may be grouped together if they are determined to be related to or associated with one another in some way. For example, network devices may be grouped together if the multiple network devices are powered on and/or attempt to connect to the network at substantially the same time. In another example, network devices may be grouped together if the multiple network devices are in close proximity to each other within the same geographic location. More specifically, a set of network devices may each be connected to a light bulb where each of the light bulbs connected to the network devices are located in the same room. Therefore, it may be beneficial for a user to turn on or off the light bulbs connected to the network devices at the same time. Furthermore, grouping of network devices may be saved and/or changed over time based on changes in the network, such as based on new devices being added to the network, devices being subtracted from the network, user preferences, among various other reasons.

Substantial variations may be made in accordance with specific requirements. For example, customized hardware might also be used, and/or particular elements might be implemented in hardware, software (including portable software, such as applets, etc.), or both. Further, connection to other mobile or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
receiving, at an established network device on a network, a communication including an indication that a new network device has been acquired by a user, wherein the new network device is associated with the user and the network;
receiving a communication including new network device data, the new network device data including identification information associated with a new network device and a request for the new network device to join the network;
generating and transmitting an authorization query, the authorization query including the identification information associated with the new network device and a new request to authorize the new network device to join the network;
receiving a response to the authorization query, the response including an indication that the new network device is authorized to join the network; and
transmitting network credentials to the new network device, wherein the network credentials facilitate the new network device joining the network, and wherein the new network device joins the network using the network credentials.

2. The method of claim 1, further comprising:
transmitting a query including a request to verify that a network account is associated with the established network device; and
receiving a response to the query including an indication that the network account is associated with the established network device.

3. The method of claim 2, further comprising:
transmitting an association communication including an indication that a new network device is associated with the network account.

4. The method of claim 1, wherein when the authorization query is received, the authorization query is displayed on an access device connected to the network, wherein the access device is configured to receive a response to the authorization query from the user.

5. The method of claim 1, wherein the established network device and the new network device were both acquired by the user.

6. The method of claim 1, further comprising:
receiving a communication including an indication that a new network device is associated with the network.

7. The method of claim 1, wherein the indication that the new network device has been acquired is based on identification information received from a source entity cloud network.

8. The method of claim 1, further comprising:
generating, by the existing network device, an authorization access point; and
receiving, by the existing network device, a request from the new network device to communicatively connect to the authorization access point.

9. A computing device, comprising:
one or more processors; and
a memory having instructions stored thereon, which when executed by the one or more processors, cause the computing device to perform operations including:
receiving, at an established network device on a network, a communication including an indication that a new network device has been acquired by a user, wherein the new network device is associated with the user and the network;
receiving a communication including new network device data, the new network device data including identification information associated with a new network device and a request for the new network device to join the network;
generating and transmitting an authorization query, the authorization query including the identification information associated with the new network device and a new request to authorize the new network device to join the network;
receiving a response to the authorization query, the response including an indication that the new network device is authorized to join the network; and
transmitting network credentials to the new network device, wherein the network credentials facilitate the new network device joining the network, and wherein the new network device joins the network using the network credentials.

10. The computing device of claim 9, further comprising instructions, which when executed by the one or more processors, cause the computing device to perform operations including:

transmitting a query including a request to verify that a network account is associated with the established network device; and receiving a response to the query including an indication that the network account is associated with the established network device.

11. The computing device of claim 10, further comprising instructions, which when executed by the one or more processors, cause the computing device to perform operations including:

transmitting an association communication including an indication that a new network device is associated with the network account.

12. The computing device of claim 9, wherein when the authorization query is received, the authorization query is displayed on an access device connected to the network, wherein the access device is configured to receive a response to the authorization query from the user.

13. The computing device of claim 9, wherein the established network device and the new network device were both acquired by the user.

14. The computing device of claim 9, further comprising instructions, which when executed by the one or more processors, cause the computing device to perform operations including:

receiving a communication including an indication that a new network device is associated with the network.

15. The computing device of claim 9, wherein the indication that the new network device has been acquired is based on identification information received from a source entity cloud network.

16. The computing device of claim 9, further comprising instructions, which when executed by the one or more processors, cause the computing device to perform operations including:

generating, by the existing network device, an authorization access point; and receiving, by the existing network device, a request from the new network device to communicatively connect to the authorization access point.

17. A non-transitory computer-readable storage medium having instructions stored thereon, which when executed by a computing device, cause the computing device to:

receive, at an established network device on a network, a communication including an indication that a new network device has been acquired by a user, wherein the new network device is associated with the user and the network;

receive a communication including new network device data, the new network device data including identification information associated with a new network device and a request for the new network device to join the network;

generate and transmitting an authorization query, the authorization query including the identification information associated with the new network device and a new request to authorize the new network device to join the network;

receive a response to the authorization query, the response including an indication that the new network device is authorized to join the network; and transmit network credentials to the new network device, wherein the network credentials facilitate the new network device joining the network, and wherein the new network device joins the network using the network credentials.

18. The non-transitory computer-readable storage medium of claim 17, further comprising instructions configured to cause the computing device to:

transmit a query including a request to verify that a network account is associated with the established network device; and receive a response to the query including an indication that the network account is associated with the established network device.

19. The non-transitory computer-readable storage medium of claim 18, further comprising instructions configured to cause the computing device to:

transmit an association communication including an indication that a new network device is associated with the network account.

20. The non-transitory computer-readable storage medium of claim 17, wherein when the authorization query is received, the authorization query is displayed on an access device connected to the network, wherein the access device is configured to receive a response to the authorization query from the user.

21. The non-transitory computer-readable storage medium of claim 17, wherein the established network device and the new network device were both acquired by the user.

22. The non-transitory computer-readable storage medium of claim 17, further comprising instructions configured to cause the computing device to:

receive a communication including an indication that a new network device is associated with the network.

23. The non-transitory computer-readable storage medium of claim 17, wherein the indication that the new network device has been acquired is based on identification information received from a source entity cloud network.

24. The non-transitory computer-readable storage medium of claim 17, further comprising instructions configured to cause the computing device to:

generate, by the existing network device, an authorization access point; and receive, by the existing network device, a request from the new network device to communicatively connect to the authorization access point.

* * * * *